(12) United States Patent
Komura et al.

(10) Patent No.: US 8,369,203 B2
(45) Date of Patent: Feb. 5, 2013

(54) THERMALLY-ASSISTED MAGNETIC RECORDING HEAD HAVING CONCAVE CORE AT LIGHT ENTRANCE SURFACE

(75) Inventors: Eiji Komura, Tokyo (JP); Koji Shimazawa, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 392 days.

(21) Appl. No.: 12/659,095

(22) Filed: Feb. 25, 2010

(65) Prior Publication Data

US 2011/0205661 A1 Aug. 25, 2011

(51) Int. Cl.
*G11B 7/00* (2006.01)
(52) U.S. Cl. ............... 369/112.27; 369/13.33; 369/13.13
(58) Field of Classification Search ............... 369/13.33, 369/13.13, 13.32, 13.02, 14, 15, 112.09, 369/112.14, 112.21, 112.27, 300; 360/59; 385/129, 31, 88–94; 29/603.01–603.27; 250/201.3, 201.5
See application file for complete search history.

(56) References Cited

U.S. PATENT DOCUMENTS

| | | | |
|---|---|---|---|
| 6,768,556 B1 | 7/2004 | Matsumoto et al. | |
| 7,221,826 B2 | 5/2007 | Hanashima et al. | |
| 2003/0066944 A1 | 4/2003 | Matsumoto et al. | |
| 2004/0081031 A1 | 4/2004 | Saga et al. | |
| 2007/0237454 A1* | 10/2007 | Fujii et al. | 385/33 |
| 2008/0151431 A1 | 6/2008 | Tanaka et al. | |
| 2010/0135615 A1* | 6/2010 | Ho et al. | 385/33 |
| 2011/0122737 A1* | 5/2011 | Shimazawa et al. | 369/13.24 |
| 2011/0222184 A1* | 9/2011 | Komura et al. | 360/59 |
| 2012/0072931 A1* | 3/2012 | Imada et al. | 720/672 |
| 2012/0092973 A1* | 4/2012 | Imada et al. | 369/13.32 |
| 2012/0113771 A1* | 5/2012 | Matsumoto | 369/13.33 |

FOREIGN PATENT DOCUMENTS

| | | |
|---|---|---|
| JP | A-2004-258610 | 9/2004 |
| JP | A-2006-276169 | 10/2006 |

* cited by examiner

*Primary Examiner* — Tan X Dinh
(74) *Attorney, Agent, or Firm* — Posz Law Group, PLC

(57) ABSTRACT

An optical waveguide of the present invention is an optical waveguide in order to directly introduce light beams emitted from a light emitting element. In a core that is a waveguide through which light propagates, a concave part is formed that is a depression in a light incident end surface that is one side where light enters. Therefore, an optical waveguide is realized that can obtain a large optical coupling efficiency is possible by the operation of phase alignment in the concave part.

13 Claims, 16 Drawing Sheets

THERMALLY-ASSISTED MAGNETIC RECORDING HEAD HAVING CONCAVE CORE AT LIGHT ENTRANCE SURFACE

BACKGROUND OF THE INVENTION

1. Field of the Invention

The present invention relates to an optical waveguide and a thermal assist magnetic recording head (or thermally-assisted magnetic recording head) that uses the same.

2. Description of Related Art

Further improvement to thin film magnetic heads and magnetic recording media is in demand in conjunction with the promotion of high recording density in magnetic disk devices in the field of magnetic recording using a head and medium. At the present time, composite type thin film magnetic heads, comprising a structure where a magnetoresistive (MR) element for reading and an electromagnetic conversion element for writing are laminated, are widely used as thin film magnetic heads.

Meanwhile, a magnetic recording medium is a so-called discontinuous body on which magnetic microparticles aggregate, and each of the magnetic microparticles is a single magnetic domain structure. Here, a single recording bit is configured from a plurality of magnetic microparticles. Accordingly, in order to increase the recording density, unevenness of the recording bit boundary must be reduced by reducing the size of the magnetic microparticles. However, reducing the size of the magnetic microparticles produces the problem of a reduction in the thermal stability of magnetization that accompanies volume reduction.

Increasing the magnetic anisotropic energy Ku of the magnetic microparticles can be considered as a countermeasure for such a problem. However, an increase in Ku causes an increase in the anisotropic magnetic field (coercive force) of the magnetic recording medium. In this regard, the upper limit of the write magnetic field intensity by the thin film magnetic head is mostly determined by the saturation magnetic flux density of the soft magnetic material that constitutes the magnetic core within the head. Accordingly, writing becomes impossible when the anisotropic magnetic field of the magnetic recording medium exceeds the tolerance determined from the upper limit of the write magnetic field intensity. Currently, one method to resolve the problem of this type of thermal stability proposes a so-called thermally-assisted magnetic recording method in which writing is performed by reducing the anisotropic magnetic field through adding heat to the magnetic recording medium immediately prior to applying the write magnetic field while using a magnetic material with a large Ku.

A commonly known method for such thermally-assisted magnetic recording uses a near-field probe, a so-called plasmon antenna, that is a piece of metal that generates a near-field from plasmon excited by irradiated laser light. For example, a plasmon antenna is disclosed in the specification of U.S. Pat. No. 6,768,556 that provides a cone shaped metal scatterer formed on a substrate, and a film, which is dielectric or the like, formed around the periphery of the scatterer.

Further, a configuration is disclosed in U.S. Patent Publication No. 2004/081031 A1 that forms a plasmon antenna in a position to contact the main magnetic pole of a perpendicular magnetic recording head so that the irradiated surface is perpendicular to the magnetic recording medium. Furthermore, technology is disclosed in U.S. Patent Publication No. 2003/066944 A1 that attempts irradiation of a stronger near-field onto the magnetic recording medium by making it a priority for the tip of the plasmon antenna to be closer to the magnetic recording medium.

The inventors of the present application are proceeding with the development of a further improved thermally-assisted magnetic recording head by using near-field irradiation in pursuit of the limit of magnetic recording potential.

When performing thermally-assisted recording with a magnetic recording head using irradiation of a near-field, a laser generating device is mounted on the magnetic recording head as a light emitting element, and the laser light emitted from the laser generating device is introduced into an optical waveguide and requires guidance to the plasmon antenna which exists in a position in close proximity to, and facing, the magnetic recording medium.

In a design of such a waveguide, as a primary object, it is required that an optical coupling efficiency be enhanced as much as possible, the efficiency being determined when the optical waveguide introduces the laser light generated by the laser generating device.

SUMMARY OF THE INVENTION

In order to solve the above issues, an optical waveguide of the present invention is an optical waveguide for introducing a light beam that is emitted from a light emitting element. The optical waveguide is structured having a core that is a waveguide through which light propagates and a clad that surrounds the periphery thereof, and a refractive index of a material that forms the core is larger than a refractive index of a material that forms the clad; and the core provides a light incident end surface that is one side where light enters and a light emitting end surface that emits the light that propagates within the waveguide, and a concave part that is a depression formed on the light incident end surface that is one side where light enters.

As a preferred mode of the optical waveguide of the present invention, the concave part is structured so that phases of light beams are aligned, the light beams being emitted from the light emitting element and entering into the waveguide.

As a preferred mode of the optical waveguide of the present invention, a cross section that is perpendicular to a light traveling direction in the core forms a quadrilateral shape, and the concave part is structured to provide a curved surface with a radius R, and the value of the radius R is configured so as to be within a range R=1.4~20 μm.

As a preferred mode of the optical waveguide of the present invention, a cross section that is perpendicular to a light traveling direction in the core forms a quadrilateral shape, and the concave part is structured to provide a curved surface with radius R, and the value of the radius R is configured so as to be within a range R=1.5~4 μm.

As a preferred mode of the optical waveguide of the present invention, a cross section that is perpendicular to a light traveling direction in the core forms a quadrilateral shape, and the concave part is structured so as to be substantially a quadrangular pyramid trapezoid shape that tapers toward the light traveling direction.

As a preferred mode of the optical waveguide of the present invention, a cross section that is perpendicular to a light traveling direction in the core forms a quadrilateral shape, and a size of an outer frame of the light incident end surface of the concave part is the same as a size of an outer frame of a core cross section, and these outer frame sizes are structured so as to be 5 μm×5 μm or less.

As a preferred mode of the optical waveguide of the present invention, a cross section that is perpendicular to the light traveling direction in the core forms a quadrilateral shape, and a size of an outer frame of the light incident end surface of the concave part is smaller than an outer frame of a core cross section.

As a preferred mode of the optical waveguide of the present invention, a material of the core is configured so as to be one type selected from a group that includes TaOx, ZrOx, TiOx and SiOn with a refractive index of 1.8 or above, and AlON with a refractive index of 1.8 or above; and a material of the clad is configured so as to be one type selected from a group that includes $Al_2O_3$, MgO, $SiO_2$ and SiON with a refractive index of less than 1.8, and AlON with a refractive index of less than 1.8.

As a preferred mode of the optical waveguide of the present invention, an antireflection film is formed on a front surface of the concave part.

The thermally-assisted magnetic recording head of the present invention is structured by providing a magnetic pole for generating a writing magnetic field from an end surface of an air bearing surface (ABS) side, the above optical waveguide through which light propagates to excite a surface plasmon, and a plasmon generator that is a part with which the light couples in the surface plasmon mode.

The optical waveguide of the present invention is the optical waveguide in order to directly introduce the light beams emitted from the light emitting element. In the core (or waveguide) where the light is propagated, the concave part is formed as a depression in the light incident end surface that is one side where the light enters. Therefore, the realization of the optical waveguide that can obtain a large optical coupling efficiency is possible by the operation of phase alignment in the concave part.

THE BRIEF DESCRIPTION OF DRAWINGS

DETAILED DESCRIPTION OF THE PRESENT INVENTION

The best mode for carrying out the present invention is hereafter described.

Figure 1:
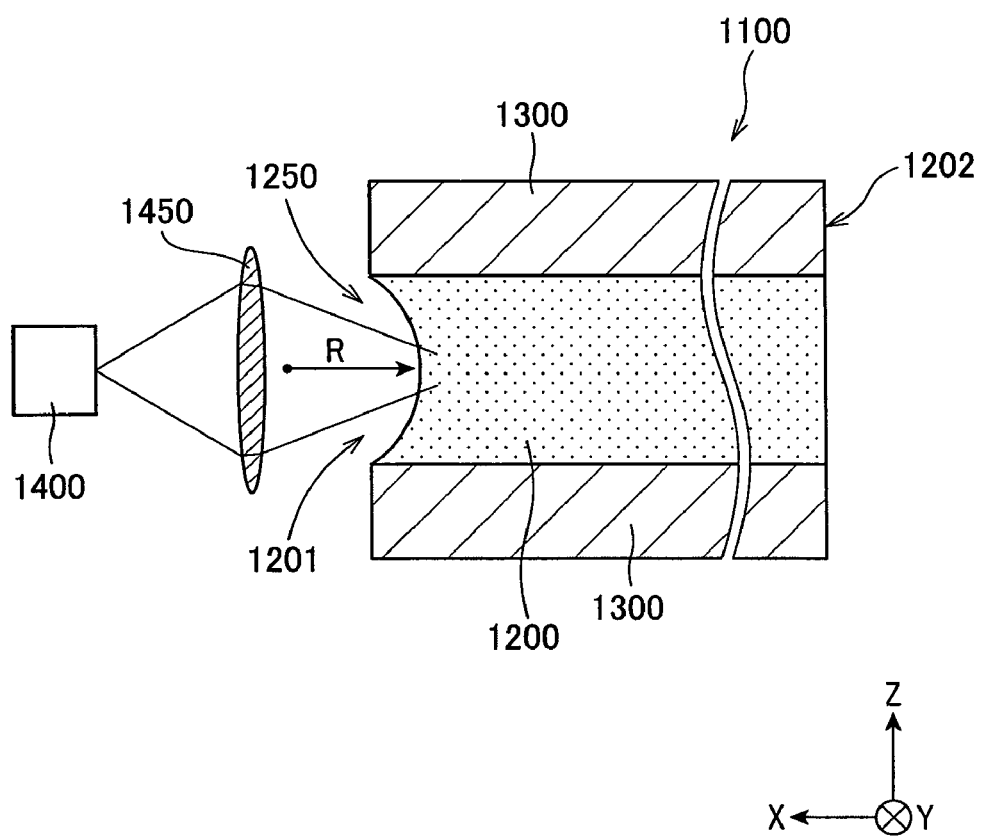
FIG. 1 is a diagrammatic cross-sectional view in the X-Z plane depicting an optical waveguide of the present invention for introducing a light beam emitted from a light emitting element.
Figure 2:
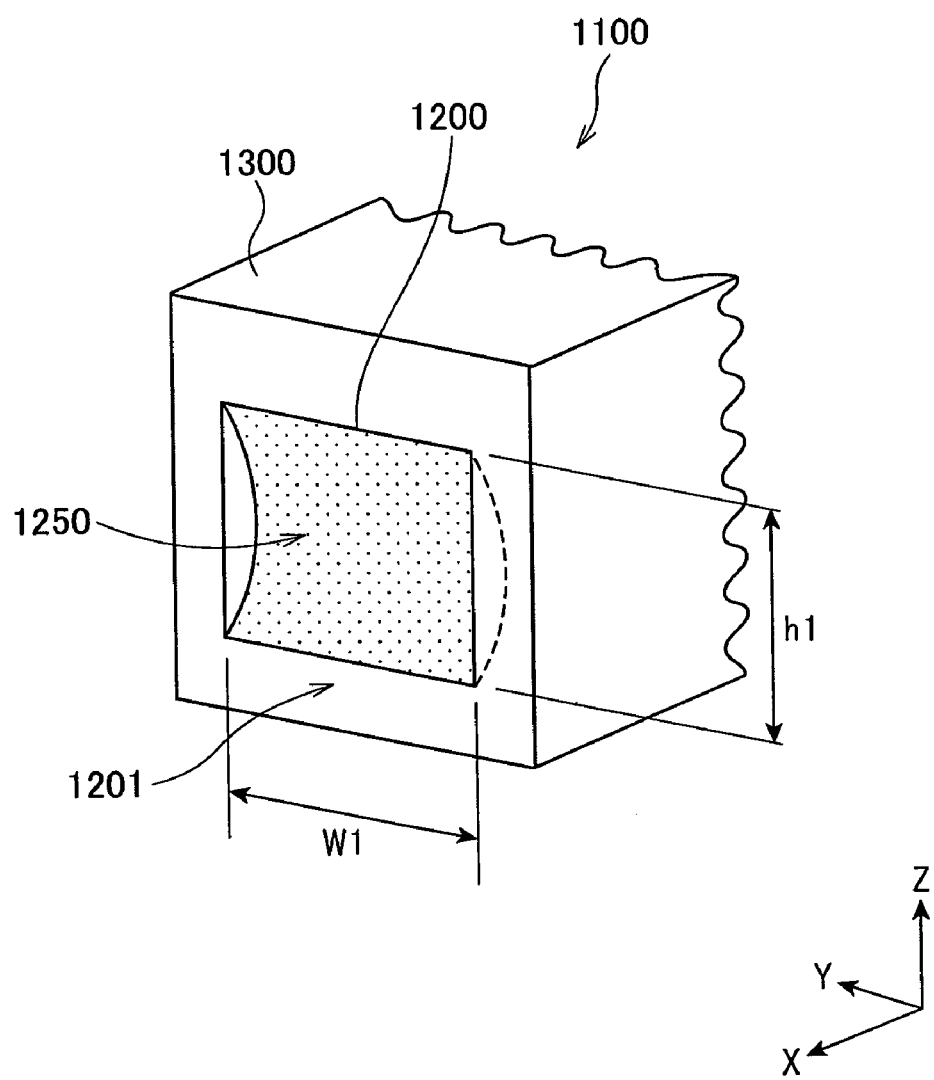
FIG. 2 is a schematic perspective view of the light incident surface side of the optical waveguide of the present invention shown in FIG. 1.

FIG. 1 a cross-sectional view in the X-Z plane diagrammatically describing an optical waveguide 1100 for introducing a light beam emitted from the light emitting element such as, for instance, a laser diode 1400, and FIG. 2 is a schematic perspective view of the light incidence plane side of the optical waveguide of the present invention shown in FIG. 1.

Figure 3:
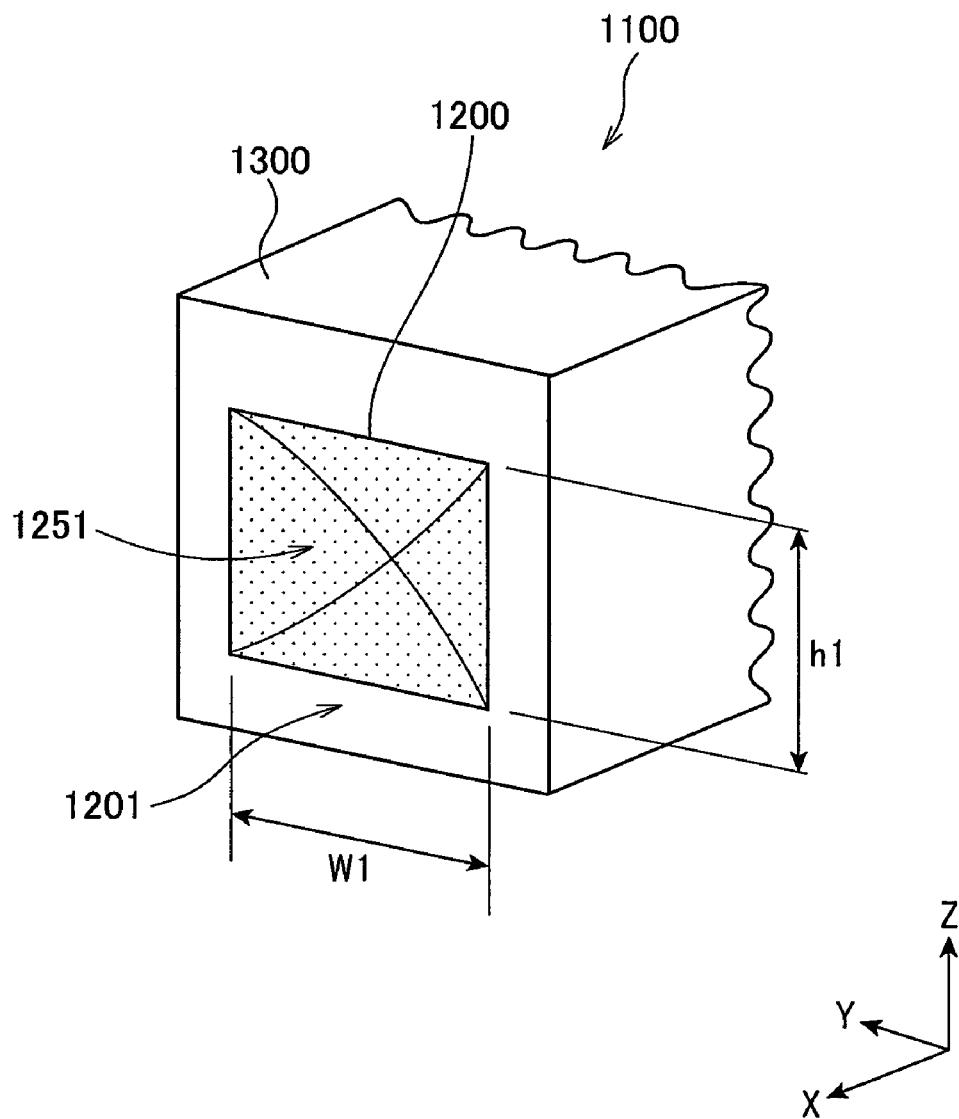
FIG. 3 is a schematic perspective view showing another modified example of the vicinity of the incident end part of the optical waveguide.
Figure 4A:
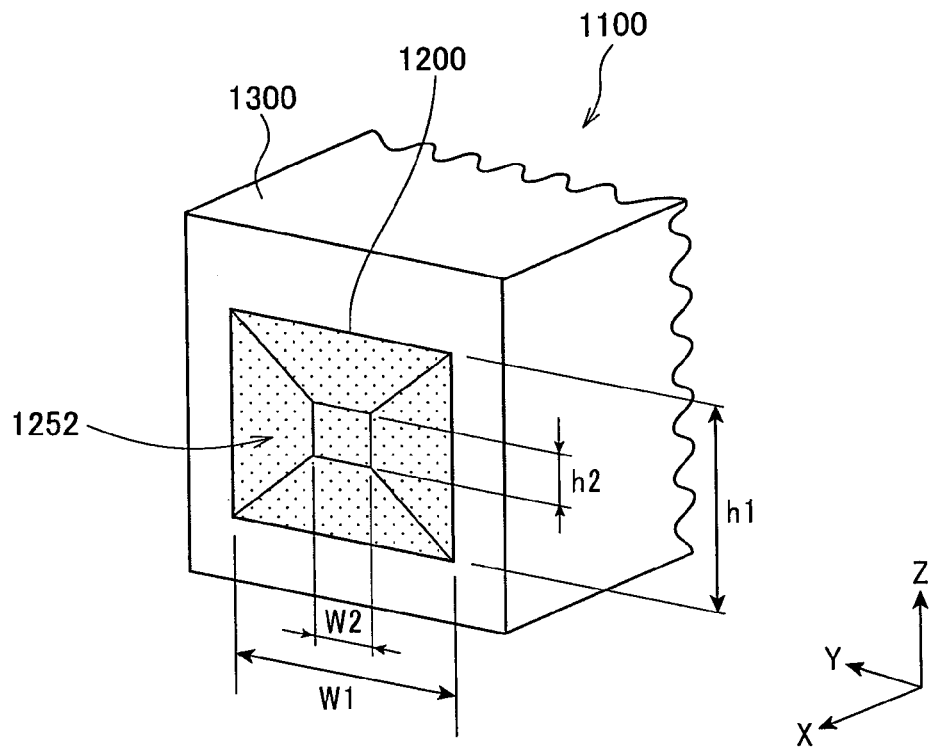
FIG. 4A and FIG. 4B are schematic perspective views respectively showing another modified example of the vicinity of the incident end part of the optical waveguide, where the size of the outer frame of the light incident end surface of the concave part is the same as the outer frame of the core cross section.
Figure 4B:
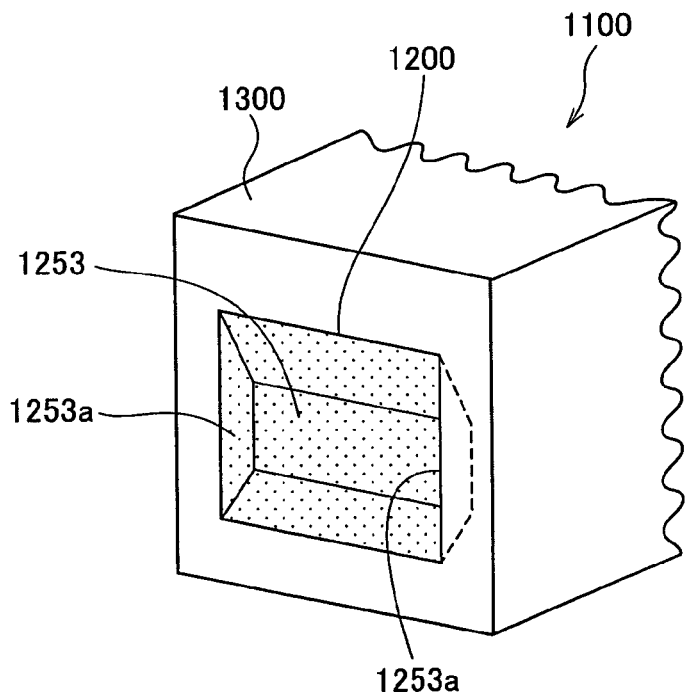
Figure 5A:
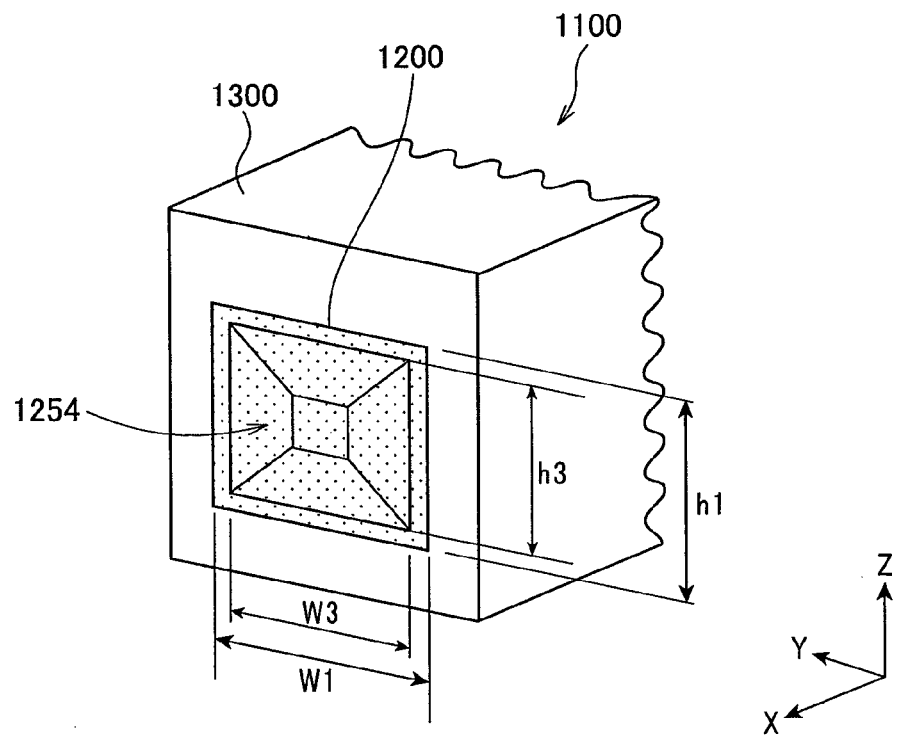
FIG. 5A and FIG. 5B are schematic perspective views respectively showing another modified example of the vicinity of the incident end part of the optical waveguide, where the size of the outer frame of the light incident end surface of the concave part is smaller than the outer frame of the core cross section.
Figure 5B:
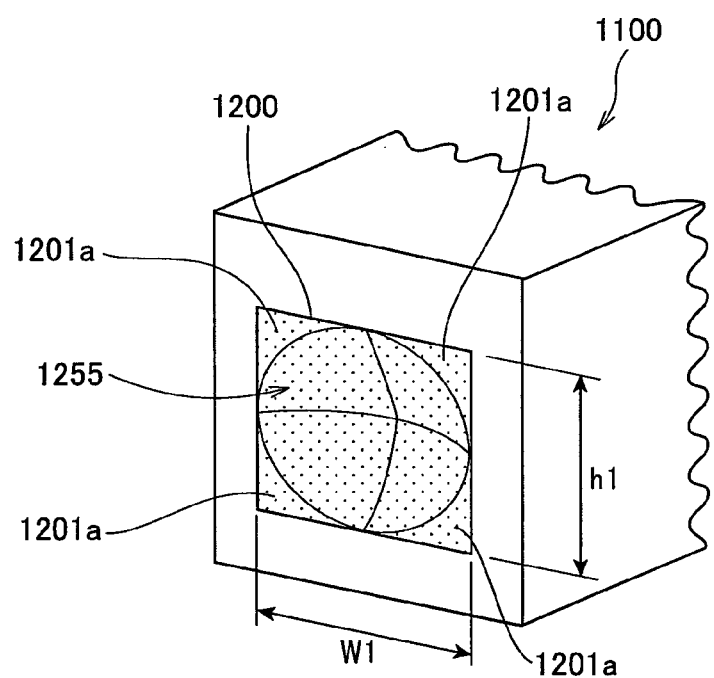

FIG. 3, FIG. 4A as well as FIG. 4B, and FIG. 5A as well as FIG. 5B are schematic perspective views, respectively corresponding to FIG. 2, showing another modified example of the incident end surface of the optical waveguide.

As shown in FIG. 1, the optical waveguide 1100 of the present invention is structured having a core 1200 that is a waveguide through which light propagates, and a cladding (hereinafter referred as clad) 1300 that surrounds the periphery thereof; and the refractive index of the material that structures the core 1200 is configured so as to be larger than the refractive index of the material that structures the clad 1300.

The core 1200 provides a light incident end surface 1201 (so-called light incident plane) that is one side where a light enters, and a light emitting end surface 1202 (so-called light emitting plane) where light that propagates within the waveguide 1200 is emitted, and a concave part 1250 is configured that is a depression formed at one side of the light incident end surface 1201 (light entrance) positioned at the side where light enters.

Such a concave part 1250 operates to align the phases of light beams that are emitted from the light emitting element 1400 such as a laser diode and enters into one side end part of the waveguide (core 1200) through a lens system 1450 that may be provided to suit the situation. Further, the concave part 1250 is formed in a configuration that enables such operation to be realized in the present invention. In addition, a so-called butt type that introduces direct light into the end surface of the waveguide without providing the lens system 1450 in FIG. 1 may also be applicable.

The cross section perpendicular to the light traveling direction in the core 1200 as shown in FIG. 1 and FIG. 2 forms a quadrilateral shape, and the concave part 1250 formed at the light incident side of the core 1200 is structured by providing a curved surface with the radius R as shown in FIG. 1. The specific configuration of the concave part 1250 shown in FIG. 1 and FIG. 2 is formed where the curved line with radius R appears in the X-Y cross section, and the curved line with radius R directly extends in the Y direction to form the configuration of the concave part 1250. In other words, the concave part 1250 is configured as if one sheet of a flexible quadrilateral plate is curved so as to form the radius R.

The value of radius R in this case is considered to be within the range of R=1.4~20 μm, and more preferably in the range of R=1.5~4 μm. When this R value is less than 1.4 μm or exceeds 20 μm, the optical coupling efficiency between the incident light and waveguide end surface has a tendency to deteriorate.

The size of the outer frame of the light incident end surface of the concave part 1250 in the present embodiment shown in FIG. 1 and FIG. 2 (the size of W1×h1 in FIG. 2) is the same size as the outer frame of the core cross section. In other words, the hollowing of the concave part 1250 begins from the outer area of the core 1200 of the light incident end surface 1201. The size of the outer frame of the concave part 1250 is preferably designed so that the width×height dimensions are 5 μm×5 μm or less (more preferably 4 μm×4 μm or less, more specifically between 4 μm×1 μm and 4 μm×3 μm (rectangle with width×height)), with the size of the outer frame being designed by taking the radius R value into account.

The concave part 1250 can be formed by etching the end part plane of the core 1200 into a concave shape by using, for instance, a reactive ion etching (RIE) method.

In addition, the refractive index $n_c$ of the material that forms the core 1200, as described above, is larger than the refractive index $n_{ad}$ of the material that forms the clad 1300. Based on this premise, a suitable material of the core 1200 is preferably one type selected from a group such as TaOx, ZrO, Si, SiON, AlON, TiOx and the like, and the material of the clad 1300 that surrounds the core 1200 is preferably one type selected from a group such as $Al_2O_3$, MgO, $SiO_2$, SiON, AlON and the like. In addition, SiON can be suitably changed within a refractive index range=1.45~2.0, and AlON can be suitably changed within a refractive power range=1.65~2.0. The refractive index of the material of the core 1200 is preferably 1.8 or above.

Description of Modified Examples of Configuration of Concave Part 1250

Modified examples of the configuration of the concave part 1250 are described hereafter.

First Modified Example

FIG. 3 shows a first modified example of the concave part that is formed on the end surface of the light incident side of the core 1200.

The concave part 1251 in FIG. 3 is the same as the embodiment shown in FIG. 2 with respect to the structural point of providing the curved surface with radius R. However, the concave part 1251 shown in FIG. 3 differs from the concave part 1250 shown in FIG. 2 with respect to the point where the entire concave part 1251 is formed as the curved surface although this may be difficult to grasp from the drawing. In other words, the entire concave part 1251 shown in FIG. 3 is curved by suitably changing the R value according to the location. A method can be used, for instance, of initially notching the plane end surface on the curved surface with the radius R, and then the remaining four corners of the plane end surface are appropriately smoothed in succession to curve gradually with a different R' value or the like.

The size of the outer frame of the light incident end surface of the concave part 1251 shown in FIG. 3 (the size of W1×h1 in FIG. 3) is the same size as the outer frame of the core cross section.

All of the radius values, such as R, R', . . . that are variously formed in this case are preferably in a range between 1.4~2.0

Second Modified Example

FIG. 4A shows a second modified example of the concave part that is formed on the end surface of the light incident side of the core 1200.

As shown in FIG. 4A, the cross sectional shape (Y-Z plane) that is perpendicular to the light traveling direction of the concave part 1252, is a quadrilateral shape (a rectangular shape) and is structured to be a substantially quadrangular pyramid trapezoid shape where the cross section gradually tapers toward the light traveling direction.

The concave part 1252 can be formed by etching the plane of the end part of the core 1200 by using, for instance, a reactive ion etching (RIE) method.

Herein, the phrase "substantially a quadrangular pyramid trapezoid shape" indicates that the shape is not limited geometrically to a precise quadrangular pyramid trapezoid shape. More specifically, it allows a configuration that is formed by hollowing the concave part by, for example, vacuum process etching or the like from among such types of etching, a form where an area that should be a plane becomes a slightly curved surface, and/or an edge (angle) for connecting a surface to a surface becomes a blunted round shape.

In the embodiment shown in FIG. 4A, the size of the outermost frame (size of W1×h1 in FIG. 4A) of the light incident end surface 1201 of the concave part 1250 that is substantially a quadrangular pyramid trapezoid shape is made to be the same size as the outer frame of the core 1200 cross section. In other words, the hollowing of the concave part 1252 already begins from the outer frame area of the core 1200 of the light incident end surface 1201.

Further, when an area defined by the outermost frame is S1 (the area of W1×h1 in FIG. 4A) and an area defined by the outer frame (the area of W2×h2 in FIG. 4A) of the deepest quadrangular shape of the light traveling direction of the concave part 1252 is S2, the structure preferably is made so that these area ratios are in a range between S2/S1=1/25~24/25 (preferably between a range between 13/25~23/25), and also the space $D_{1-2}$ of the depth direction (−X direction) of S1 and S2 is in a range between 0.001~2.0 μm (preferably a range between 0.0015~0.5 μm).

In addition, the size (size of W1×h1 in FIG. 1) of the outermost frame that regulates the area S1 is preferably designed to be normally 5 μm×5 μm or less for the width× height measurement (preferably 4 μm×4 μm or less, and more specifically within the range of 4 μm×1 μm~4 μm×3 μm or less (rectangular with the width×height).

Third Modified Example

FIG. 4B shows a third modified example of the concave part that is formed on the end surface of the incident light side of the core 1200.

As shown in FIG. 4B, the shape of the concave part 1253 is similar to the shape of the concave part shown in FIG. 4A described above. The shape of the concave part 1253 shown in FIG. 4B is different from the concave part shape shown in FIG. 4A described above with respect to the point where the Y-direction surfaces 1253*a* facing each other are in a mutually nearly parallel relationship and do not funnel into the center of the concave part.

Fourth Modified Example

FIG. 5A shows a fourth modified example of the concave part that is formed on the end surface of the incident light side of the core 1200. As shown in FIG. 5A, the shape of the concave part 1254 is similar to the concave part shape shown in FIG. 4A described above. A difference from the shape of the concave part shown in FIG. 4A described above is that the outer frame (W3×h3 in FIG. 5A) of the light incident end surface of the concave part 1254 is smaller than the outer frame (W1×h1 in FIG. 5A) of the core end surface.

Fifth Modified Example

FIG. 5B shows a fifth modified example of the concave part that is formed on the end surface of the incident light side of the core 1200. As shown in FIG. 5B, the shape of the concave part 1255 is a configuration where the plane end surface is notched on the curved surface with the radius R and the four corners 1201*a* remain as planar end surfaces. The value of the radius R is in a range of R=1.4~20 μm, and more preferably in a range of R=1.5~4 μm. The circular outer frame of the light incident end surface of the concave part 1255 is configured to be contained within the outer frame (W1×h1 in FIG. 5B) of the core end surface.

In addition, in any of the concave parts in the above modified first through fifth examples, the concave part is formed in a configuration so as to operate to align the phases of a light beam that is emitted from the light emitting element and enters into the optical waveguide.

Moreover, an antireflection film is preferably formed on the front surface of the concave parts 1250 through 1255 that are formed on the light incident end surface 1201 of the present invention.

For the specifications of the laser diode 1400 used in the optical waveguide 1100 of the present invention, an end surface light emitting type LD, a surface light emitting type LD or the like is used, and an oscillation wavelength between 780 and 500 nm is preferable.

Further, when a lens system 1450 is placed between the optical waveguide 1100 and the laser diode 1400, a distance from the lens system 1450 to the incident end surface of the optical waveguide 1100 is between 2~500 μm, and preferably between 2.5~100 μm. Furthermore, when the lens system 1450 is not placed, a gap (or space) between the optical waveguide 1100 and the laser diode 1400 is preferred to be between 2~5 μm, and more preferably between 2.5~3.5

The optical waveguide 1100 in such present invention can obtain a large optical coupling efficiency by the operation of phase alignment (phase matching) in the concave part.

Furthermore, this is applicable to electronic components such as a transmission component and an optical integrated circuit that are fundamentally difficult for regulating optical axis matching.

Moreover, the layered structure of the optical waveguide as shown in each drawing between FIG. 1 and FIG. 5B can be layered by using a thin-film manufacturing technology such as sputtering, milling, RIE, and photo resist methods.

A suitable mode of the thermally-assisted magnetic recording head where the optical waveguide of the present invention is suitably applied is described hereafter. However, it is not limited to the structure of the thermally-assisted magnetic recording head itself described below.

(Description of Thermally-Assisted Magnetic Recording Head)

Prior to describing the thermally-assisted magnetic recording head, definitions of the terms used in the present specification will be given. For the layered structure or element structure formed on the element formation surface of the slider substrate of the magnetic recording head, when viewed from the standard layer or element, the substrate side is "down (downward)," and the opposite side thereof is "up (upward)." Further, "X, Y, and Z directions" are designated in the drawings as necessary for the embodiment of the magnetic head. Here, the Z direction corresponds to the aforementioned up and down directions, the +Z side corresponds to the trailing side, and the −Z side corresponds to the reading side. The Y direction is the track width direction, and the X direction is the height direction. Further, the "side surface" of the waveguide provided within the corresponding magnetic head in the description of the magnetic recording head indicates an end surface other than an end surface orthogonal to the propagation direction (−X direction) of the light which propagates in the waveguide from the end surfaces which surround the waveguide. Therefore, the "upper surface" and "lower surface" of the waveguide are also the "side surface" in the description of the magnetic recording head, and the "side surface" is the plane which enables complete reflection of propagated light within the waveguide that corresponds to the core.

Figure 6:
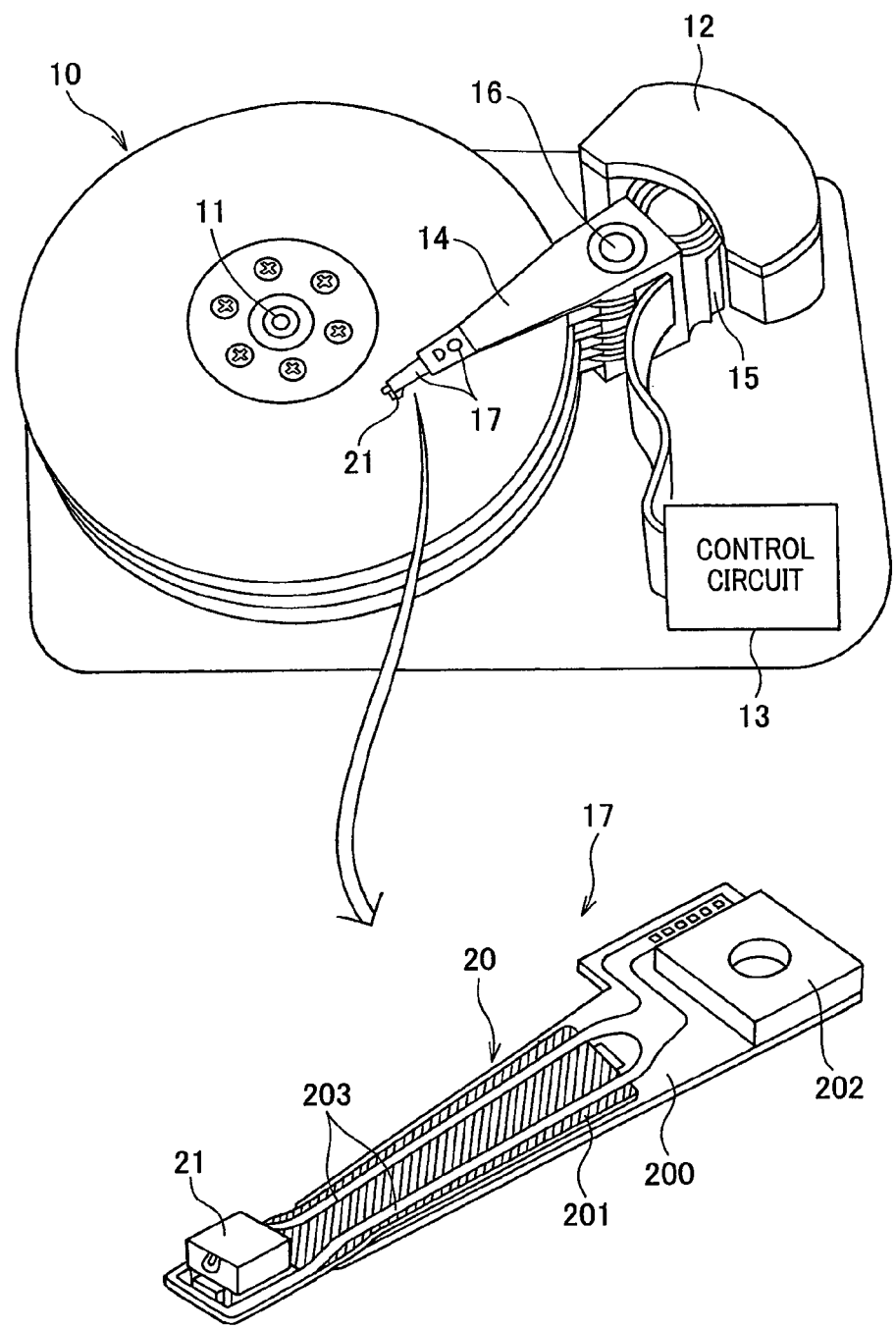
FIG. 6 is a perspective view schematically showing a structure of the principal parts of one embodiment of an HGA and magnetic recording device in which the optical waveguide of the present invention can be applied.

FIG. 6 is a perspective view schematically illustrating the structure of the essential components in one embodiment of the magnetic recording device and HGA (head gimbal assembly). Here, the perspective view of the HGA illustrates the side facing the magnetic recording medium surface of the HGA.

The magnetic disk device, as the magnetic recording device indicated in FIG. 6, rotates around the rotational axis of the spindle motor 11, and provides a plurality of magnetic disks 10 as the magnetic recording medium, an assembly carriage device 12 that provides a plurality of drive arms 14, a head gimbal assembly (HGA) 17 that provides a thermally-assisted magnetic recording head 21 that is a thin film magnetic head attached to the tip of each drive arm 14, and a record reproduction and light emission control circuit 13 that controls the writing and reading operation of the thermally-assisted magnetic recording head 21, and that is for controlling the light emission operation of the laser diode which is the light source to generate the laser light for use in the thermally-assisted magnetic recording to be described hereafter.

The magnetic disk 10, in the present embodiment, is for perpendicular magnetic recording, and has a structure in which a soft magnetic under layer, an interim layer, and a magnetic recording layer (perpendicular magnetized layer) are layered in that order onto the disk substrate. The assembly carriage device 12 is a device for determining the position of the thermally-assisted magnetic recording head 21 on the track aligned with recording bits formed in the magnetic recording layer of the magnetic disk 10. Within the assembly carriage device 12, the drive arms 14 are stacked in a direction along the pivot bearing axis 16 and are configured with the ability for angular swing centrally around the axis 16 by a voice coil motor (VCM) 15.

Moreover, the structure of the magnetic disk device that relates to the present invention is not limited to the structure described above. For example, the magnetic disk 10, drive arms 14, HGA 17, and thermally-assisted magnetic recording head 21, may also be a unit.

In addition, according to FIG. 6, with the HGA 17, the suspension 20 is structured to provide a load beam 200, a flexure 201 that is fixed to the load beam 200 having elasticity, and a base plate 202 prepared at the base of the load beam 200. Further, above the flexure 201, a wiring member 203 is provided and is configured with a connection pad electrically connected to the lead conductive body and both ends thereof. The thermally-assisted magnetic recording head 21 is at the tip end portion of the suspension 20 and is fixed to the flexure 201 so as to face the surface of each magnetic disk 10 at a predetermined spacing (flying height). In addition, one end of the wiring member 203 is electrically connected to the terminal electrode of the thermally-assisted magnetic recording head 21.

Moreover, the structure of the suspension 20 also is not limited to the structure described above. An IC chip for driving the head, although not illustrated in the drawing, may also be mounted midway on the suspension 20.

Figure 7:
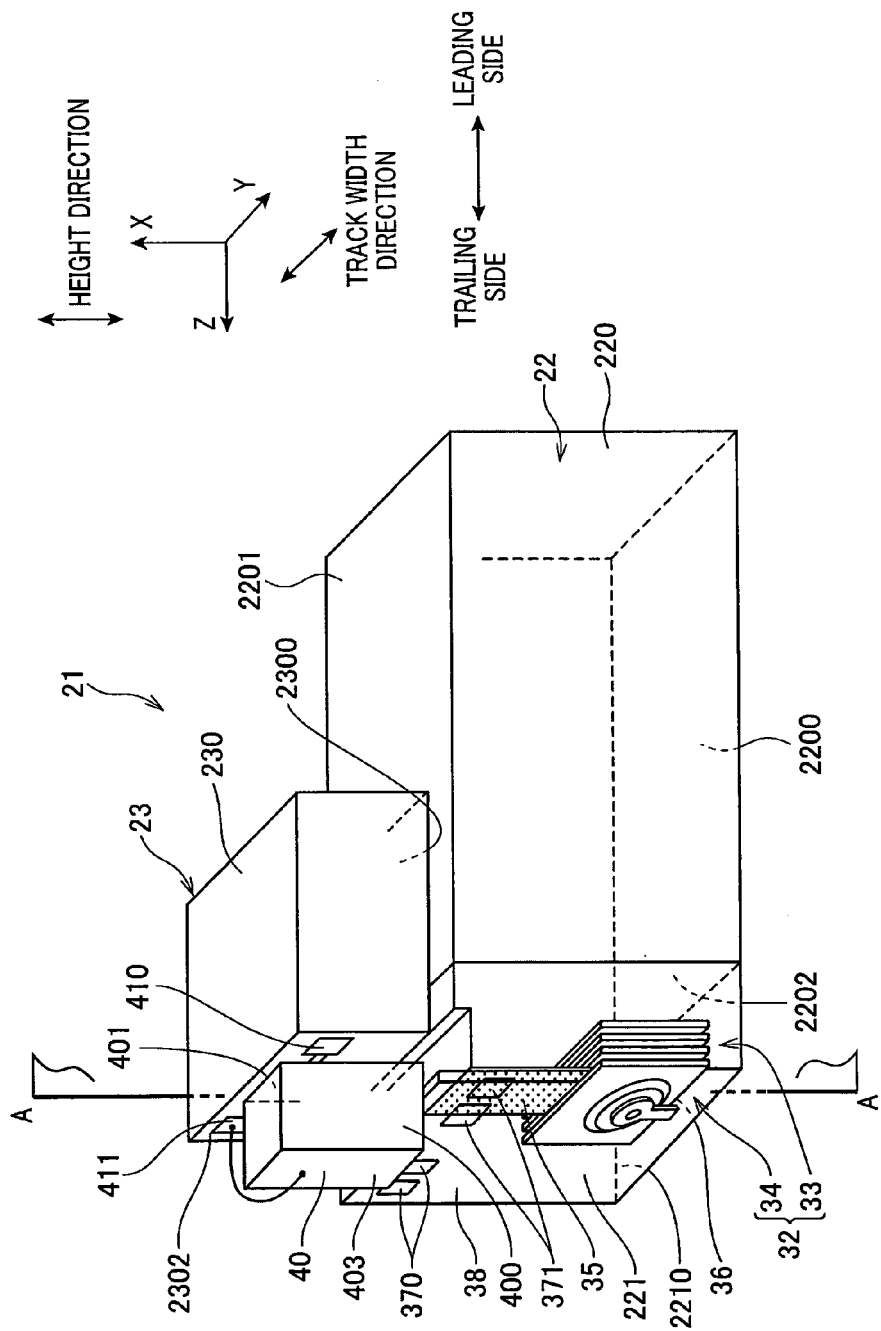
FIG. 7 is a perspective view schematically showing a structure of the principal parts of the thermally-assisted magnetic recording head in which the waveguide of the present invention can be applied.

FIG. 7 is a perspective view illustrating one embodiment of the thermally-assisted magnetic recording head 21 according to the present invention.

The thermally-assisted magnetic recording head 21, as illustrated in FIG. 7, provides a slider 22 and a light source unit 23.

The slider 22 is formed from AlTiC ($Al_2O_3$—TiC) or the like, and provides a slider substrate 220 having an air bearing surface (ABS) 2200 that is a medium opposing surface processed to obtain the appropriate flying height, and a head unit 221 formed on the element forming surface 2202 orthogonal to the ABS 2200.

Further, the light source unit 23 provides a unit substrate 230 having an adhesion surface 2300 and is formed from AlTiC ($Al_2O_3$—TiC) or the like, and a laser diode 40 as the light source prepared at a light source joining surface 2302 orthogonal to the adhesion surface 2300. Here, the slider 22 and the light source unit 23 are mutually joined together by bonding the rear surface 2201 of the slider substrate 220 with the adhesion surface 2300 of the unit substrate 230.

Here, the rear surface 2201 of the slider substrate 220 is the end surface of the opposing side to the ABS 2200 of the slider substrate 220. Moreover, the thermally-assisted magnetic recording head 21 may also be formed by directly mounting the laser diode 40 to the slider 22 without using the light source unit 23.

The head unit 221 formed on the element formation surface 2202 of the slider substrate 220 of the slider 22 provides a head element 32, a waveguide 35, a surface plasmon-generator 36, an overcoat layer 38, a pair of terminal electrodes 370, and a pair of terminal electrodes 371. Herein, the head element 32 is structured by providing both the MR element 33 for reading data from the magnetic disk and the electromagnetic conversion element 34 for writing data to the magnetic disk. The waveguide 35 is configured to guide laser light from the laser diode 40 provided by the light source unit 23 to the air bearing surface side. The surface plasmon-generator 36 is configured by the waveguide 35 together with the near-field generator. The overcoat layer 38 is formed on the element formation surface 2202 so as to cover the MR element 33, the electromagnetic conversion element 34, the waveguide 35, and the surface plasmon-generator 36. The pair of the terminal electrodes 370 is electrically connected to the MR element 33 and is exposed to the upper surface of the overcoat layer 38. The pair of the terminal electrodes 371 is electrically connected to the electromagnetic conversion element 34 and is exposed to the upper surface of the overcoat layer 38 in the same manner. Here, the waveguide 35 provides the same structure as the core 1200 described by using FIG. 1~FIG. 5B above and is the same.

The terminal electrodes 370 and 371 are electrically connected to the connection pad of the wiring member 203 prepared at the flexure 201 (see FIG. 6).

The MR element 33 and one end of the electromagnetic conversion element 34 as well as the surface plasmon-generator 36 reaches to the head end surface 2210 that is the medium opposing surface of the head unit 221. Here, the head end surface 2210 and the ABS 2200 make up the medium opposing surface of the entire thermally-assisted magnetic recording head 21.

At the time of actual writing or reading, the thermally-assisted magnetic recording head 21 hydro-dynamically flies with a predetermined flying height above the rotating magnetic disk surface. At such time, the ends of the MR element 33 and the electromagnetic conversion element 34 face each other through an appropriate magnetic spacing with the surface of the magnetic recording layer of the magnetic disk.

In this state, the MR element 33 performs reading by sensing the data signal magnetic field from the magnetic recording layer, and the electromagnetic conversion element 34 performs writing by applying a data signal magnetic field to the magnetic recording layer. Here, at the time of writing, the laser light propagated via the waveguide 35 from the laser diode 40 of the light source unit 23, as will be described hereafter, couples with the surface plasmon-generator 36 in the surface plasmon mode and excites the surface plasmon to the surface plasmon-generator 36.

This surface plasmon propagates from the propagative edge equipped on the surface plasmon-generator 36 to be described hereafter, toward the head end surface 221, and a near-field is generated at the end of the head end surface side 221 of the surface plasmon-generator 36. This near-field reaches the magnetic disk surface heating the magnetic recording layer portion of the magnetic disk, and thereby lowering the anisotropic magnetic field (coercive force) of such portion to a certain level for enabling a writing process. As a result, thermally-assisted magnetic recording is able to be performed.

Figure 8:
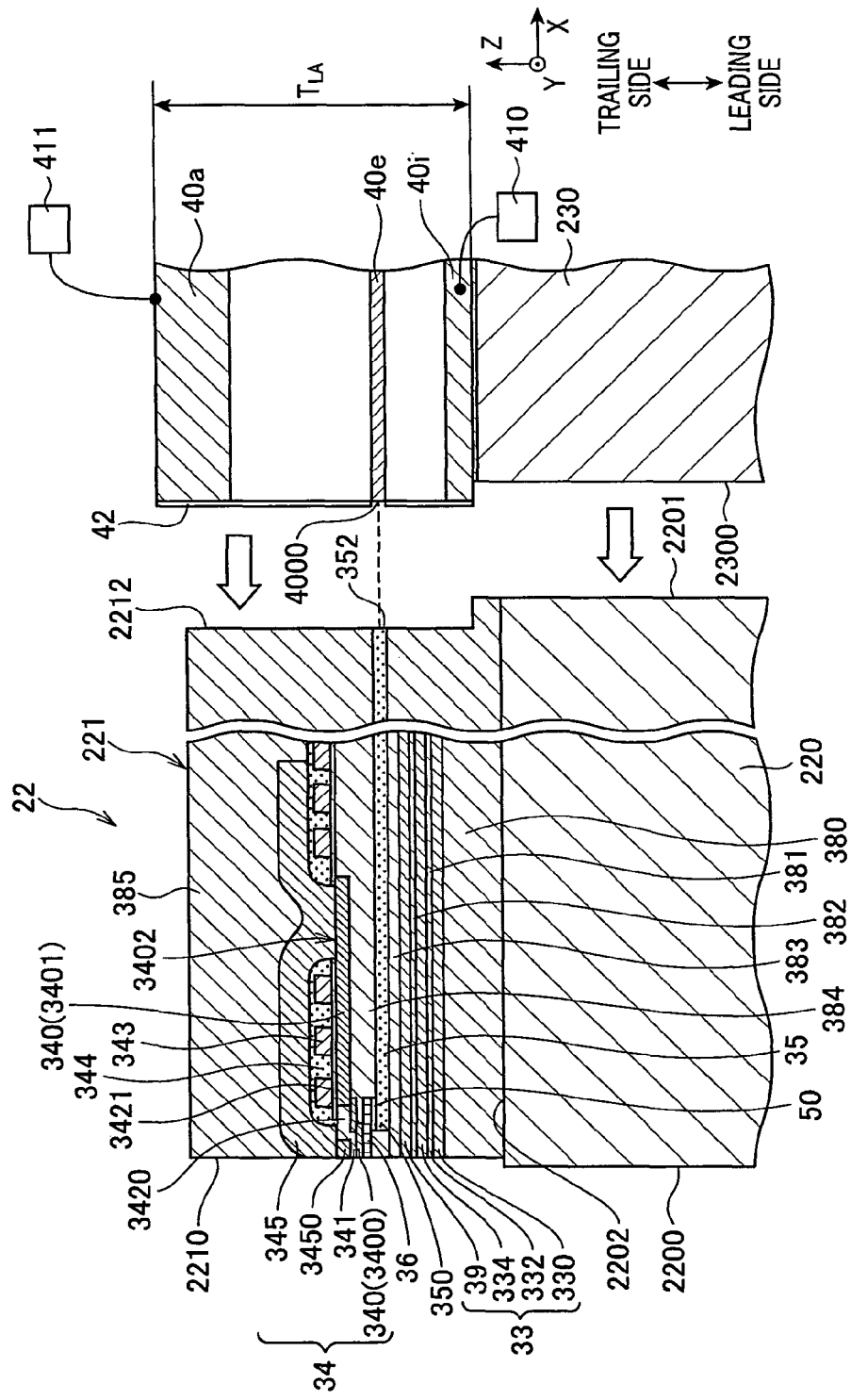
FIG. 8 is a cross-sectional view of the A-A plane in FIG. 7 schematically showing a structure of the principal parts of the thermally-assisted magnetic recording head.

FIG. 8 schematically illustrates the structure of the essential components of the thermally-assisted magnetic recording head 21 and is an A-A plane cross-sectional view of FIG. 7.

As illustrated in FIG. 8, the MR element 33 includes the MR multilayer 332, as well as the lower shield layer 330 and the upper shield layer 334, as a pair, placed in a position to sandwich the insulating layer 381 and the MR multilayer 332. The MR element 33 is formed on the insulating layer 380 that is formed on the element formation surface 2202. The upper and lower shield layers 334 and 330 prevent the MR multilayer 332 from receiving external magnetic fields that become noise.

The upper and lower shield layers 334 and 330 are magnetic layers formed by, for example, a frame plating method or a sputtering method, and are composed of, for example, NiFe (Permalloy), FeSiAl (Sendust), CoFeNi, CoFe, FeN, FeZrN or CoZrTaCr, or the like, or a soft magnetic material of a multilayered film or the like of these materials. The thickness is, for example, approximately between 0.5~3 μm.

The MR multilayer 332 is a magnetic sensitive part that senses a signal magnetic field by using the MR effect and may be any of, for example, a CIP-GMR multilayer that utilizes a current in plane-giant magnetoresistive (CIP-GMR) effect, a CPP-GMR multilayer that utilizes a current perpendicular to plane-giant magnetoresistive (CPP-GMR) effect, or a TMR multilayer that utilizes a tunneling magnetoresistive (TMR) effect.

The MR multilayer 332 utilizing any type of the above MR effects can sense a signal magnetic field from a magnetic disk with high sensitivity. Moreover, when the MR multilayer 332 is a CPP-GMR multilayer or TMR multilayer, then the upper and lower shield layers 334 and 330 also perform the role of an electrode. Meanwhile, when the MR multilayer 332 is a CIP-GMR multilayer, then an insulating layer is provided between each of the upper and lower shield layers 334 and 330, and further, a magnetoresistive (MR) lead layer is provided that is electrically connected to the MR multilayer 332.

The MR multilayer 332 may be formed by various structures. For example, when the MR multilayer 332 is a TMR multilayer, the MR multilayer 332 may be formed with a structure by laminating the following layers: an antiferromagnetic layer with a thickness of about between 5~15 nm (nanometers) composed of, for example, IrMn, PtMn, NiMn, RuRhMn or the like; a magnetization pinned layer in which two ferromagnetic layers composed of, for example, CoFe or the like, sandwiches a nonferromagnetic metallic layer composed of, for example, Ru, and of which the magnetization direction is pinned by the antiferromagnetic layer; a tunnel barrier layer composed of a nonmagnetic dielectric material that is formed of a metallic film of a thickness of about between 0.5~1 nm and composed of, for example, Al, AlCu, or the like, the metallic film being oxidized either by natural oxidation or by oxygen directed into a vacuum device; and a magnetization free layer that is structured from the two layered films of, for example, CoFe, or the like, with a thickness of about 1 nm and NiFe, or the like, with a thickness of about between 3~4 nm and that are ferromagnetic layers, and that provides a tunnel exchange-coupling with the magnetization pinned layer through the tunnel barrier layer.

Similarly in FIG. 8, the electromagnetic conversion element 34 is for perpendicular magnetic recording, and provides a main magnetic pole layer 340, a gap layer 341, a write coil layer 343, a coil insulating layer 344, and a write shield layer 345.

The main magnetic pole layer 340 is formed on the insulating layer 384 composed of an insulating material such as $Al_2O_3$ (alumina), and is a waveguide for concentrating and guiding the magnetic flux that is generated by applying a writing electric current to the write coil layer 343 to the magnetic recording layer (perpendicular magnetization layer) of the magnetic disk for writing.

The main magnetic pole layer 340 has a structure in which the main magnetic pole 3400 and the main magnetic pole body part 3401 are sequentially laminated. Of these, the main magnetic pole 3400 reaches the head end surface 2210, and has a first main magnetic pole unit 3400a having a small width $W_p$ (see FIG. 10) in the track width direction, and a second main magnetic pole unit 3400b that is positioned above the first main magnetic pole unit 3400a and to the rear (+X side) of the first main magnetic pole unit 3400a.

In this manner, because the first main magnetic pole unit 3400a has a small $W_p$, a minute writing magnetic field can be generated, thereby enabling a track width to be set to a minute value which corresponds to a high recording density.

The main magnetic pole 3400 is formed from a soft magnetic material having a higher saturation magnetic flux density than the main magnetic pole body part 3401, and is formed from a soft magnetic material such as, for example, FeNi, FeCo, FeCoNi, FeN, or FeZrN or the like, that are ferrous alloys in which Fe is the main component. The thickness of the main magnetic pole unit 3400a is, for example, between 0.1 and 0.8 μm.

The gap layer 341 forms a gap for magnetically separating the main magnetic pole layer 340 and the write shield layer 345 in the vicinity of the head end surface 300. The gap layer 341 is structured of a non magnetic insulating material such as $Al_2O_3$ (alumina), $SiO_2$ (silicon dioxide), AlN (nitrous aluminum) or diamond-like carbon (DLC), or a nonmagnetic conductive material such as Ru (ruthenium). The thickness of the gap layer 341 is determined by the gap between the main magnetic pole layer 340 and the write shield layer 345, with, for example, a thickness of about between 0.01~0.5 μm.

The write coil layer 343 is formed on the insulating layer 3421 composed of insulating material such as $Al_2O_3$ (alumina) such that a part of the write coil layer 343 is disposed at least between the main magnetic pole layer 340 and the write shield layer 345 in a single revolution, and which has a spiral structure around the back contact part 3402 as the center.

The write coil layer 343 is formed of a conductive material such as, for example, Cu or the like. The write coil insulating layer 344 covers the write coil layer 343 that is made of an insulating material, such as a heat application cured photoresist, accordingly insulating intermediate surfaces between the write coil layer 343 and the main magnetic pole layer 340 and between the write coil layer 343 and the write shield layer 345.

The write coil layer 343, although a single layer in the present embodiment, may also be two or more layers or a helical coil. Further, the number of revolutions (windings) is not limited to the number illustrated in FIG. 8, for example, but is preferably set to between 2 and 7 revolutions.

The write shield layer 345 reaches the head end surface 2210 and functions as the conductive magnetic path for the magnetic flux returned from the soft magnetic under layer provided beneath the magnetic recording layer (perpendicular magnetization layer) of the magnetic disk. The thickness of the write shield layer 345 is, for example, about between 0.5~5 μm.

Further, with respect to the write shield layer 345, the portion facing the main magnetic pole layer 340 similarly reaches the head end surface 2210 to be a trailing shield 3450 to introduce the spread magnetic flux emitted from the main magnetic pole layer 340.

The trailing shield 3450, in the present embodiment, is flattened together with the insulating film 3420 and the main magnetic pole body part 3401, and has a width in the track width direction larger than not only the first main magnetic pole unit 3400a but also the main magnetic pole body part 3401. By providing this type of a trailing shield 3450, the magnetic field gradient becomes steeper between the end of the trailing shield 3450 and the first main magnetic pole unit 3400a. As a result, signal output jitter is smaller and the error rate at the time of reading can be reduced. Further, the write shield layer 345 is formed from soft magnetic material, and particularly, the trailing shield 3450 has a high saturation magnetic flux density and is formed from NiFe (Permalloy) or a ferrous alloy material or the like that is similar to the main magnetic pole 3400.

As similarly illustrated in FIG. 8, the waveguide 35 and the surface plasmon-generator 36 are provided between the MR element 33 and the electromagnetic conversion element 34, and provide the near-field generator that is the optical system within the head unit 221. Here, the waveguide 35 extends from the end surface 352 (synonymous with reference number 1150a in FIG. 1~FIG. 5) to the end surface 350 of the head end surface 2210 side, the end surface 352 is parallel to the element formation surface 2202 and reaches the head end surface 2212.

Further, a portion of the upper surface (side surface) of the waveguide 35 and a portion of the bottom surface of the surface plasmon-generator (including the propagative edge 360 (FIG. 9)) are mutually opposed at a predetermined spacing, and the portion sandwiched between these portions becomes the buffer portion 50 having a lower refractive index than the refractive index of the waveguide 35.

The buffer portion 50 functions for coupling the laser light that propagates through the waveguide 35 to the surface plasmon-generator 36 in the surface plasmon mode. Moreover, the buffer portion 50 may be a portion of the insulating layer 384 that is a portion of the overcoat layer 38, and may be a new layer provided separately from the insulating layer 384. The waveguide 35, surface plasmon-generator 36, and the buffer portion 50 are further described referring to FIG. 9.

In addition, in the present embodiment, an interelement shield layer 39 is provided between the MR element 33 and the electromagnetic conversion element 34 (waveguide 35), the interelement shield layer 39 being sandwiched by the insulating layers 382 and 383. This interelement shield layer 39 functions for shielding the MR element 33 from the magnetic field generated from the electromagnetic conversion element 34, and may be formed of the same soft magnetic material as the upper and lower shield layers 334 and 330. Moreover, the interelement shield layer 39 is not essentially required and an embodiment that does not include the interelement shield layer 39 is also practical. Further, a bucking coil part may be formed between the interelement shield layer 39 and the waveguide 35.

The bucking coil part is configured to suppress a wide area adjacent tracks erasing (WATE) phenomenon that is an unnecessary writing operation and/or a deleting operation to the magnetic disk by generating a magnetic flux to neutralize the magnetic flux loop that starts at the electromagnetic conversion element 34 via the upper and lower shield layers 334 and 330 of the MR element 33.

Similarly as illustrated in FIG. 8, many materials may be used for the laser diode 40, which are commonly used for communications, optical system disk storage, and material analysis or the like. For example, these materials may include InP series, GaAs series, GaN series etc. A wavelength $\lambda_1$ of the irradiated laser light can be set arbitrarily in the range of, for example, 375 nm~1.7 µm.

Specifically, for example, an InGaAs P/InP quaternary mixed crystal system laser diode can be used, of which the possible wavelength area is between 1.2~1.67 µm. The laser diode 40 has a multilayered structure that includes an upper electrode 40a, an active layer 40e, and a lower electrode 40i. A reflecting layer composed of $SiO_2$, $Al_2O_3$ or the like for exciting the oscillation due to the total reflection is formed in front and behind the cleavage surface of the multilayered structure, and an opening is provided to the reflecting layer 42 in the position of the active layer 40e that includes the light emitting center 4000. Here, the thickness of the laser diode 40 can be, for example, between 60~200 µm.

In addition, a power source within the magnetic disk device can be used to drive the laser diode 40. In actuality, the magnetic disk device normally provides a power source of, for example, about 2V that is a sufficient voltage for the laser oscillation operation. Further, the power consumption of the laser diode 40 is, for example, about several tens of m Watt [mW], that can be sufficiently supplied from the power source in the magnetic disk device.

Actually, a predetermined voltage is applied by the power source between the terminal electrode 410 electrically connected to the lower electrode 40i and the terminal electrode 411 electrically connected to the upper electrode 40a. The laser light is irradiated from the opening that includes the light emitting center 4000 of the reflecting layer 42 by oscillating the laser diode 40.

Moreover, the laser diode 40 and the drive terminal electrodes 410 and 411 are not limited to the embodiment described above.

The light source unit 23 provides a unit substrate 230, and a laser diode 40 equipped to a light source installation surface 2302 of the unit substrate 230, a terminal electrode 410 electrically connected to an electrode that is the bottom surface 401 of the laser diode 40, and a terminal electrode 411 electrically connected to an electrode that is the top surface 403 of the laser diode 40. The terminal electrodes 410 and 411 are electrically connected to connection pads of the wiring member 203 equipped to the flexure 201 (see FIG. 6).

When a predetermined voltage is applied to the laser diode 40 through both of the electrodes 410 and 411, the laser light is irradiated from the light emitting center placed on the light emitting surface 400 of the laser diode 40. Here, in such a head structure illustrated in FIG. 8, it is preferred to set the oscillation direction of the electric field of the laser light generated by the laser diode 40 perpendicular (Z direction) to the lamination layer of the active layer 40e. In other words, the laser diode 40 is preferably a chip that generates TM mode polarization.

As described above, the thermally-assisted magnetic recording head 21 is configured by connecting the light source unit 23 and the slider 22. This connection allows the adhesion surface 2300 of the unit substrate 230 to join with the back surface 2201 of the slider substrate 220. At such time, the position of the unit substrate 230 and the slider substrate 220 are determined so that the laser light generated from the laser diode 40 just enters the end surface 352 that is an opposite side to the ABS 2200 of the waveguide 35.

Moreover, although the size of the slider 22 and the light unit 23 are discretionary, the slider may also be, for example, a so-called femto slider with a width of 700 µm in the track width direction (Y direction)×a height of 850 µm (Z direction)×a thickness of 230 µm (X direction). In this case, the light unit 23 may also be one size smaller than this, for example, with a width of 425 µm in the track width direction×a height of 300 µm×a thickness of 300 µm.

Figure 9:
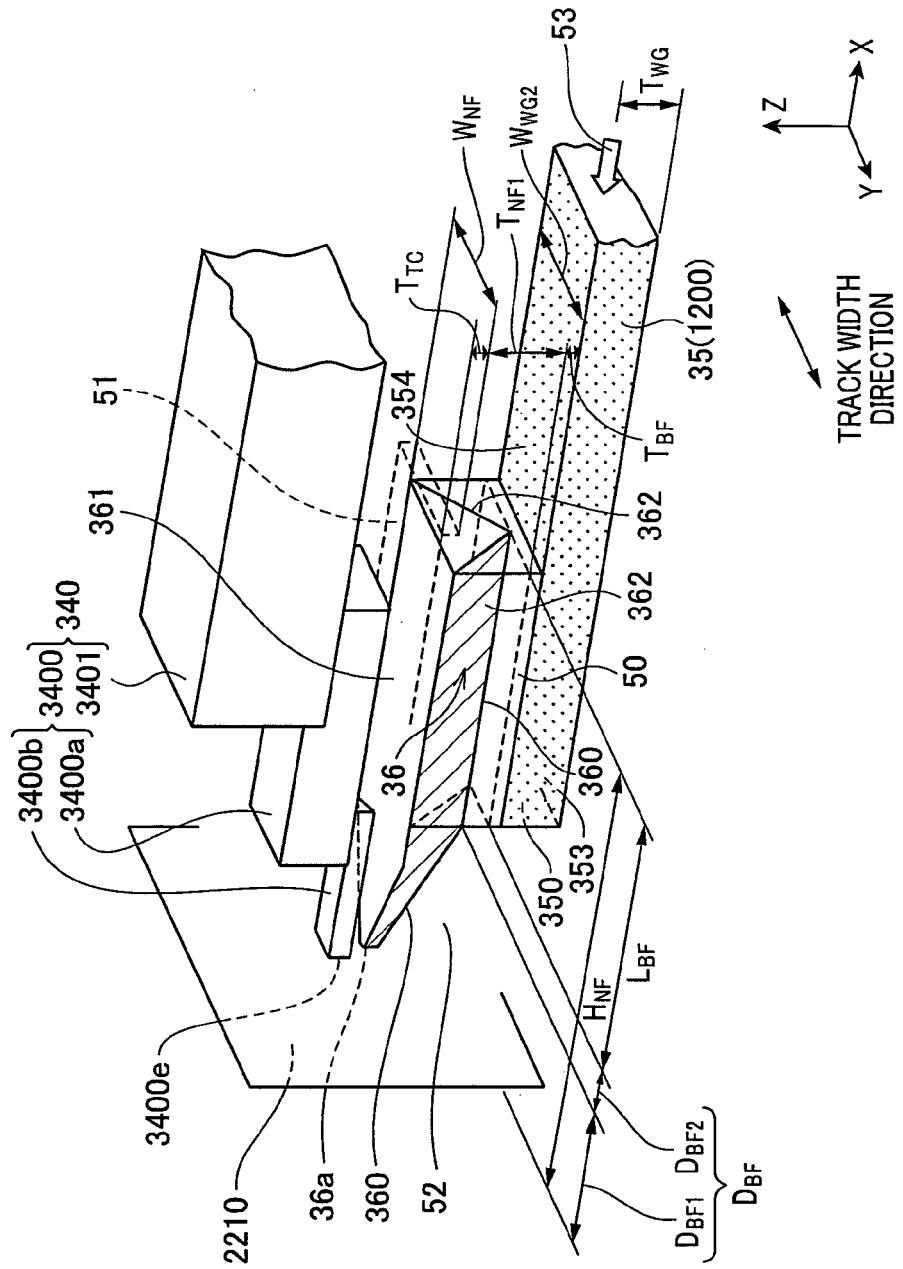
FIG. 9 is a perspective view schematically showing a structure of the waveguide, surface plasmon-generator, and the main magnetic pole layer.

FIG. 9 is a perspective view schematically illustrating the structure of the waveguide 35, the surface plasmon-generator 36 and the main magnetic pole layer 340. In the same drawing, the head end surface 2210 is positioned to the left side, the head end surface including a portion from which the writing magnetic field and the near-field are irradiated toward the magnetic recording medium.

As illustrated in FIG. 9, the waveguide 35 is provided for propagating the laser light 53 for near-field generation, and the surface plasmon-generator 36 is provided which includes a propagative edge 360 through which the surface plasmon excited by the laser light 53 propagates. The location of the waveguide 35 partially illustrated in FIG. 9 corresponds to the core 1200 in FIG. 1~FIG. 5B.

Additionally, a portion sandwiched between a portion of the side surface 354 of the waveguide 350 and a portion of the bottom surface 362 that includes the propagative edge 360 of the surface plasmon-generator 36 facing the portion of the side surface 354 is the buffer portion 50. Namely, a portion of the propagative edge 360 is covered by the buffer portion 50.

The buffer portion 50 functions for coupling the laser light 53 to the surface plasmon-generator 36 in the surface plasmon mode. Here, side surfaces of the waveguide 35 indicate any surfaces among surfaces surrounding the waveguide 35 other than the end surface 350 of the head end surface 2210 that is perpendicular to the propagation direction (−X direction) of the laser light 53 and the other end surface of the opposing side thereof (not shown). These side surfaces are surfaces on which the laser light 53 that propagates through the waveguide 35 corresponding to the core is completely reflected.

Moreover, in the present embodiment, a portion of the side surface 354 of the waveguide 35 contacts the buffer portion, and the side surface 354 is the upper surface of the waveguide 35. Further, the buffer portion 50 may also be a portion of the overcoat layer 38 (see FIG. 7), and may also be a new layer provided separately from the overcoat layer 38.

The surface plasmon-generator 36 further provides a near-field generation end surface 36a that reaches the head end surface 2210. The near-field generation end surface 36a is in the vicinity of the end surface 3400e that reaches the head end surface 2210 of the main magnetic pole 3400. Further, the propagative edge 360 extends from a portion covered by the buffer portion 50 where the portion couples with the laser light 53 in the surface plasmon mode, to the near-field generation end surface 36a, and functions for propagating the surface plasmon excited by the laser light 53 to the near-field generation end surface 36a.

Here, a portion of the propagative edge 360 of the head end surface 2210 side has a linear shape or a curved shape in a manner of approaching the end surface 361 that is an opposite side of the propagate edge 360 of the surface plasmon-generator 36 as it approaches the near-field generation end surface 36a. Moreover, a corner of the propagative edge 360 may also be rounded in order to prevent the surface plasmon from escaping from the propagative edge 360. At this time, the curvature radius of the rounded corner is, for example, in the range of 5~500 nm.

Further, the surface plasmon-generator 36 in the present embodiment has a shape that tapers toward the near-field generation surface 36a in the height direction (Z direction) in the vicinity of the head end surface 2210.

Further, in the surface plasmon-generator 36, the cross-section in the YZ plane has a triangular shape, and especially has a predetermined triangular shape in the vicinity of the head end surface 2210. As a result, the near-field generation end surface 36a, in the present embodiment, has a triangular shape of which a vertex is an end of the propagative edge 360 that reaches the end surface 36a (see FIG. 10). Here, when the surface plasmon that propagates through the propagative edge 360 reaches the near-field generation end surface 36a, the near-field is generated from the near-field generation end surface 36a.

The waveguide 35 and buffer portion 50 are provided at the −Z side of the surface plasmon-generator 36 (bottom side of the drawing), namely, at the opposite side to the main magnetic pole 3400. As a result, the propagative edge 360 that is covered by the buffer portion 50 is also positioned on the opposite side to the main magnetic pole 3400. With such a structure, even if a distance between the end surface 3400e of the main magnetic pole 3400 that generates the write magnetic field and the near-field generation surface that generates the near-field is set sufficiently small (preferably 100 nm or less), the waveguide 35 can be sufficiently separated from the main magnetic pole 3400 and the main magnetic pole body part 3401. As a result, a situation can be avoided where a portion of the laser light 53 is absorbed by the main magnetic pole 3400 composed of metal and the main magnetic pole body part 3401, and the light amount that is expected to be converted to the near-field is reduced.

As illustrated in FIG. 9, the shape of the waveguide 35 (here synonymous with the waveguide core part 1152 in FIG. 1~FIG. 4) may be a rectangular cuboid. However, a width of a portion on the head end surface 2210 side in the track width direction (Y direction) may narrow. The width $W_{WG2}$ of the portion on the end surface 350 side in the track width direction (Y direction) can be, for example, between about 0.3~100 μm. The thickness $T_{WG}$ (Z direction) can be, for example, between 0.1~4 μm. The height (or length) (X direction) can be, for example, between about 10~300 μm.

Further, the side surfaces of the waveguide 35 or, in other words, the upper surface 354 and the lower surface 353, and both of the side surfaces 351 in the track width diction (Y direction) contact the overcoat layer 38, excluding the portion contacting the buffer portion 50 (see FIG. 7). Here, the waveguide 35 is configured from material having a higher refractive index $n_{WG}$ than the refractive index $n_{OC}$ of the structural material of the overcoat layer 38, and formed by, for example, a sputtering method or the like. For example, when the wavelength $\lambda_L$ of the laser light is 600 nm and the overcoat layer 38 is formed from $SiO_2$ (n=1.5), the waveguide 35 may be formed from $Al_2O_3$ (n=1.63). In addition, when the overcoat layer 38 is formed from $Al_2O_3$ (n=1.63), the waveguide 35 may be formed from $SiO_xN_Y$ (n=1.7~1.85), $Ta_2O_5$ (n=2.16), $Nb_2O_5$ (n=2.33), TiO (n=2.3~2.55) or $TiO_2$ (n=2.3~2.55). By configuring the waveguide with these types of materials, propagation loss of the laser light 53 can be maintained at a low level due to the favorable optical properties of the materials. In addition, while the waveguide 35 functions as the core, the overcoat layer 38 functions as the clad. Thereby, a complete reflection condition for every side surface is prepared. Accordingly, more of the laser light 53 reaches the buffer portion 50, which improves the propagation efficiency of the waveguide 35.

Here, the waveguide 35 has a multilayered structure of dielectric material, and in which the higher layer may have a larger refractive index n than a lower layer. For example, by sequentially laminating conductive material in which the value of the composition ratio of X and Y is suitably altered in $SiO_xN_Y$, this type of the multilayered structure can be realized. The number of the lamination layers can be, for example, between 8~12 layers.

As a result, when the laser light 53 is directly polarized in the Z direction, more laser light 53 (a larger amount of the laser light) can be propagated to the buffer portion 50 side in the Z direction. At this time, a desired propagation position can be realized in the Z direction of the laser light 53 by selecting the composition of each layer, the layer thickness, and layer count for this multilayered structure.

The surface plasmon-generator 36 is preferably formed from conductive material such as a metal, for example, Pd, Pt, Rh, Ir, Ru, Au, Ag, Cu or Al, or from alloys composed of a plurality of the elements. Further, the width $W_{NF}$ of the tracking width direction (Y direction) in the upper surface 361 of the surface plasmon-generator 36 can be set sufficiently smaller than the wavelength of the laser light 53, for example, between about 10~100 nm. The thickness $T_{NF1}$ (Z direction) can also be set sufficiently smaller than the wavelength of the laser light 53, for example, between about 10~100 nm. The length (height) (X direction) of the HNF can be set, for example, between about 8~6.0 μm.

The buffer portion 50 is formed from a dielectric material that has a refractive index $N_{BF}$ lower than the refractive index $N_{WG}$ of the waveguide 35. For example, when the wavelength $\lambda_L$ of the laser light is 600 nm and the waveguide 35 is formed from Al$_2$O$_3$ (n=1.63), the buffer portion 50 may be formed from SiO$_2$ (n=1.46).

In addition, when the waveguide 35 is formed from Ta$_2$O$_5$ (n=2.16), the buffer portion 50 may be formed from SiO$_2$ (n=1.46) or Al$_2$O$_3$ (n=1.63). In these cases, the buffer portion 50 can be a portion of the overcoat layer 38 (FIG. 7) that functions as the clad composed from SiO$_2$ (n=1.46) or Al$_2$O$_3$ (n=1.63).

Further, the length of the buffer portion 50 (in the X direction), in other words, the length $L_{BF}$ of the coupling portion between the waveguide 35 and the surface plasmon-generator 36, is preferably between 0.5~5 μm. The thickness $T_{BF}$ of the buffer portion 50 (in the Z direction) is preferably between 10~200 nm. The length $L_{BF}$ and the thickness $T_{BF}$ of the buffer portion 50 are critical parameters for achieving suitable excitation and propagation of the surface plasmon.

Further, the end of the head end surface 2210 side of the buffer portion 50 is separated from the head end surface 2210 by only the distance $D_{BF}$ in the X direction. A propagation distance of the surface plasmon is regulated by the distance $D_{BF}$.

Similarly as illustrated in FIG. 9, a thermal conductive layer 51 is preferably provided between the surface plasmon-generator 36 and the first main magnetic pole 3400a, and provided on the head end surface 2210 side. The thermal conductive layer 51 is formed from an insulating material of, for example, AlN, SiC or DLC or the like, having a high thermal conductivity compared with the overcoat layer 38 (see FIG. 7). By providing this type of thermal conductive layer 51, a portion of the heat can be released to the main magnetic pole 3400 and the main magnetic pole body part 3401 through the thermal conductive layer 51. The heat is generated at the time when the surface plasmon-generator 36 generates the near-field.

In other words, the main magnetic pole 3400 and the main magnetic pole body part 3401 can be used as heat sinks. As a result, an excessive temperature increase of the surface plasmon-generator 36 can be suppressed, and an unnecessary protrusion in the near-field generation end surface 36a and a sharp drop in optical power efficiency in the surface plasmon-generator 36 can be avoided.

The thickness $T_{TC}$ of the thermal conductive layer 51 is set to a sufficiently small value of 100 nm or less that corresponds to a spacing $D_{N-P}$ (see FIG. 10) between the near-field generation end surface 36a above the head end surface 2210 and the end surface 3400e of the main magnetic pole 3400.

Additionally, the refractive index $n_{IN2}$ of the thermal conductive layer 51 is set to be the same or less than the refractive index $n_{IN1}$ of the insulating layer 52 that covers the propagative edge 360 of the surface plasmon-generator 36. In other words, the propagative edge 360 of the surface plasmon-generator 36 is prepared so as to be covered by a material having the same refractive index $n_{IN2}$ as the material covering the opposite side end surface 361 or by a material having a higher refractive index $n_{IN1}$.

Accordingly, the surface plasmon can be stably propagated on the propagative edge 360. In actuality, it is understood that refractive index $n_{IN1}$ ≧ refractive index $n_{IN2}$ × 1.5 is preferred.

Similarly illustrated in FIG. 9, the main magnetic pole layer 340, as described above, includes the main magnetic pole 3400 and the main magnetic pole body part 3401. Of these, the main magnetic pole 3400 includes the first main magnetic pole unit 3400a having an end surface 3400e that reaches the head end surface 2210, and a second main magnetic pole unit 3400b where the end of the head end surface 2210 side overlaps onto a portion of the opposing side to the head end surface 2210 of the first main magnetic pole unit 3400a.

Further, the end of the head end surface 2210 side of the main magnetic pole body part 3401 overlaps onto a portion of the opposing side to the head end surface 2210 of the second main magnetic pole unit 3400b. In this manner, the portion of the head end surface 2210 of the main magnetic pole layer 340 inclines so as to approach the end of the head end surface 2210 side of the surface plasmon-generator in relation to the element formation surface 2202 (see FIG. 8) while facing toward the head end surface 2210. Accordingly, the main magnetic pole layer 340 is sufficiently separated from the waveguide 35, and the end surface 3400e of the main magnetic pole 3400 can be sufficiently closed to the near-field generation end surface 36a.

Figure 10:
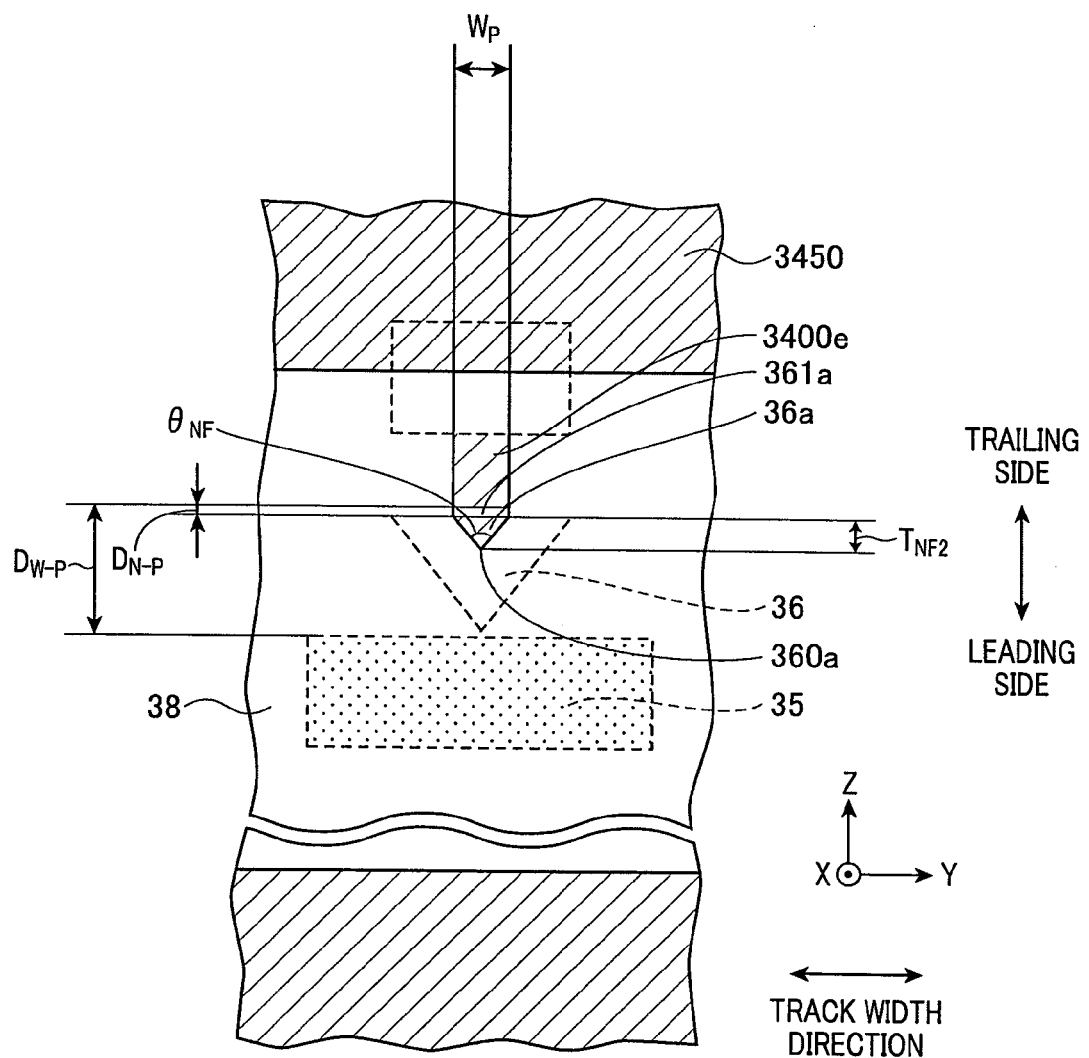
FIG. 10 is a plane view showing a form of the end surface on the head part end surface of the surface plasmon-generator and electromagnetic conversion element.

FIG. 10 is a plan view illustrating the shape of the end surface on the head end surface 2210 of the electromagnetic conversion element 34 and the surface plasmon-generator 36.

As illustrated in FIG. 10, in the electromagnetic conversion element 34, the main magnetic pole 3400 (first main magnetic pole unit 3400a) and the write shield layer 345 (trailing shield 3450) reach the head end surface 2210. Of these, the shape of the end surface 3400e on the head end surface 2210 of the main magnetic pole 3400 is, for example, a rectangle, a square, or a trapezoid.

Herein, the width $W_p$ described above is the length of the edge of the leading side in the end surface 3400e of the main magnetic pole 3400, and it determines the width of the track formed on the magnetic recording layer of the magnetic disk. The width $W_p$ is, for example, between about 0.05~0.5 μm.

Further, the near-field generation end surface 36a of the surface plasmon-generator 36 is in the vicinity of the end surface 3400e of the main magnetic pole 3400 on the head end surface 2210, and positioned at the leading side (−Z side) of the end surface 3400e. Herein, when the spacing between the near-field generation end surface 36a and the end surface 3400e is defined as $D_{N-P}$, it is preferred that the spacing $D_{N-P}$ is a sufficiently small value of 100 nm or less, and particularly 20 nm or more, and further preferably 30 nm or more.

With the thermally-assisted magnetic recording head of the present embodiment, because the near-field generation end surface 36a is an essential heating action part and the end surface 3400e is the writing part, a writing magnetic field having a sufficiently large gradient can be applied to a sufficiently heated part in the magnetic recording layer of the magnetic disk. Accordingly, a stable writing operation can be reliably implemented through thermal assistance.

In addition, with respect to the near-field generation end surface 36a, in the present embodiment, the bottom edge 361a is held at the trailing side (+Z side) on the head end surface 2210, and the end 360a of the propagative edge 360 is the vertex of the leading side (−Z side) so that an isosceles triangle is formed. The height (thickness of the head end surface 2210 of the surface plasmon-generator 36) $T_{NF2}$ of the near-field generation end surface 36a is preferably 30 nm or below, and more preferably 20 nm or below. Accordingly, the near-field light emitting position on the near-field generation end surface 36a is in the vicinity of the end edge 361a on the trailing side and becomes closer to the end surface 3400e of the main magnetic pole 3400.

Further, the vertex angle $\theta_{NF}$ in the vertex 360a of the isosceles triangle is preferably between about 60~130 deg., and particularly more preferably between about 80~110 deg. By adjusting the vertex angle $\theta_{NF}$, the light emitting position of the near-field in the near-field generation end surface 36a can be on the trailing side.

Additionally, when the spacing between the waveguide 35 and the main magnetic pole 3400 is $D_{W-P}$, the spacing $D_{W-P}$ can be sufficiently large when the spacing $D_{N-P}$ described above is set to an extremely small value. In other words, according to the structure illustrated in FIG. 9, the waveguide 35 can be sufficiently separated from the main magnetic pole 3400 and the main magnetic pole body part 3401. As a result, a situation can be avoided in which a portion of the laser light is absorbed by the main magnetic pole 3400 made of metal or the main magnetic pole body part 3401, thereby reducing the quantity of light converted to the near-field.

Figure 11:
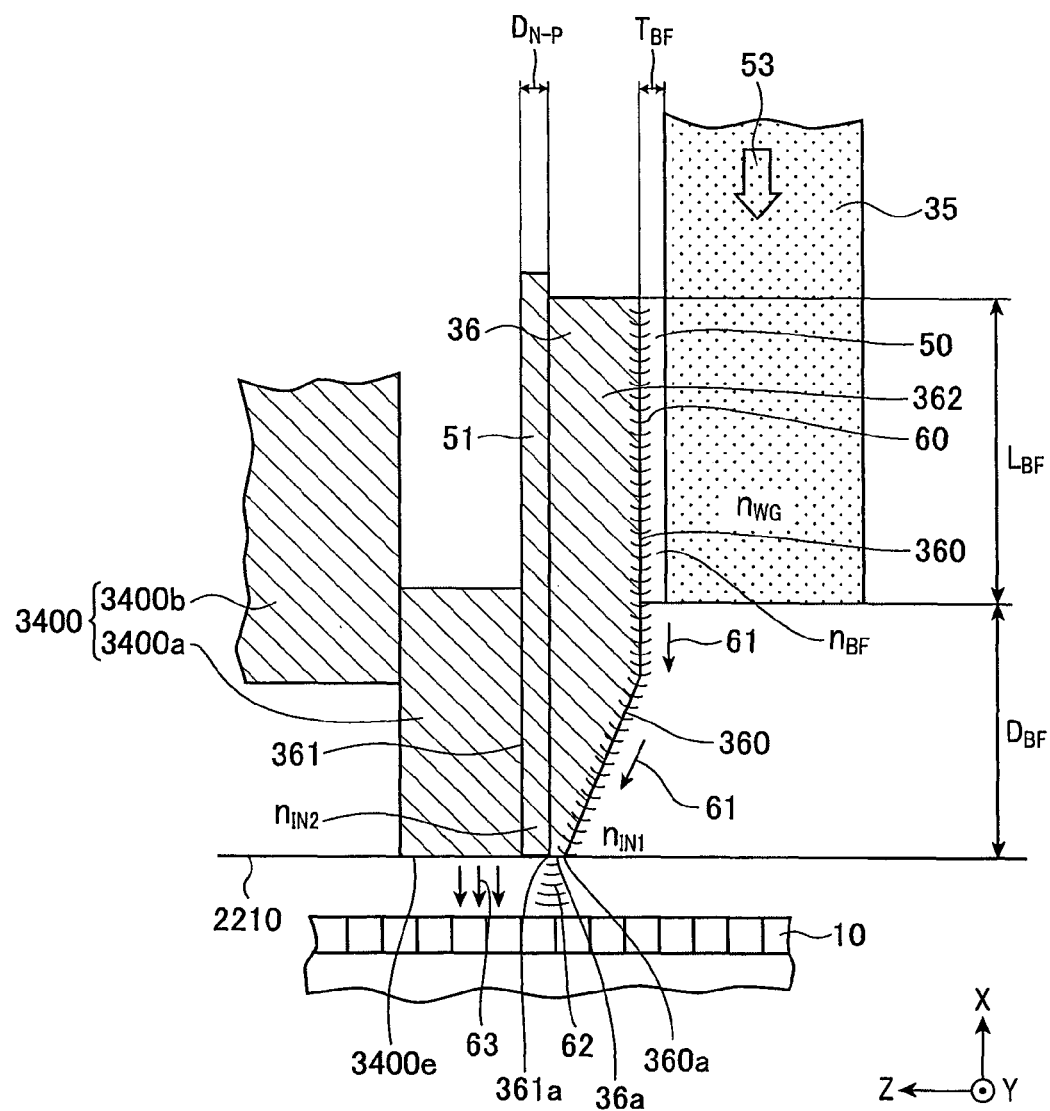
FIG. 11 is a schematic view to explain the thermally-assisted magnetic recording where the surface plasmon mode is used.

FIG. 11 is a schematic for describing thermally-assisted magnetic recording that uses a surface plasmon mode.

As illustrated in FIG. 11, at the time of writing to the magnetic recording layer of the magnetic disk 10 through the electromagnetic conversion element 34, initially, the laser light 53 irradiated from the laser diode 40 of the light source unit 23 propagates through the waveguide 35. Next, the laser light 53 that advances to the vicinity of the buffer portion 50 is coupled with an optical configuration of the waveguide 35 having a refractive index $n_{WG}$, the buffer portion 50 having a refractive index $n_{BF}$, and the surface plasmon-generator 36 composed of a conductive material such as a metal, and induces the surface plasmon mode to the propagative edge 360 of the surface plasmon-generator 36. In other words, it is coupled to the surface plasmon-generator 36 in the surface plasmon mode.

In actuality, the evanescent light within the buffer portion 50 is excited from the optical field conditions of the buffer portion 50 and the waveguide 35 that are the core. Next, the surface plasmon mode is induced in a form in which the evanescent light and the electric load fluctuation are excited by the metal surface (propagative edge 360) of the surface plasmon-generator 36, thereby exciting the surface plasmon. Moreover, more precisely, what is being excited in this system is the surface plasmon polariton because the surface plasmon, which is the elementary excitation, is coupled with the electromagnetic wave. However, hereinafter surface plasmon polariton will be abbreviated to surface plasmon.

The propagative edge 360 is in the closest position to the waveguide 35 in the inclined lower surface 362 of the surface plasmon-generator 36, and since the electric field which is the angular part is easily focused, the surface plasmon is easily excited. At this time, the induction of the surface plasmon can be realized by setting so that the refractive index $n_{BF}$ of the buffer portion 50 is set smaller than the refractive index $n_{WG}$ of the waveguide 35 ($n_{BF}<n_{WG}$), and by appropriately selecting the height of the aforementioned buffer portion 50 (of the X direction), namely, the length $L_{BF}$ of the coupled portion of the waveguide 35 and the surface plasmon-generator 36, and the thickness $T_{BF}$ of the buffer portion 50 (of the Z direction). The induction of the surface plasmon mode is described in, for example, Michael Hochberg, Tom Baehr-Jones, Chris Walker & Axel Scherer, "Integrated Plasmon and Dielectric Waveguides," OPTICS EXPRESS Vol. 12, No. 22, pp. 5481-5486 (2004), and in U.S. Patent Publication No. 2005/0249451 A1.

The surface plasmon 60 in the inducted surface plasmon mode is excited on the propagative edge 360 of the surface plasmon-generator 36 and propagates on the propagative edge 360 along the arrow indicator 61. The propagation of the surface plasmon 60 is realized under the following condition: the propagative edge 360 of the surface plasmon-generator 36 is covered with a material having the same index as the refractive index $n_{IN2}$ of a material covering the end surface 361 that is opposite to the propagative edge 360, or covered with another material having a higher refractive index $n_{IN1}$ than the index $n_{IN2}$. Actually, it is understood that the preferred condition is that the refractive index $n_{IN1} \geq$ (refractive index $n_{IN2} \times 1.5$). In FIG. 11, the refractive index $n_{IN2}$ of the thermal conductive layer 51 is set to be lower than the refractive index $n_{IN1}$ of the insulating layer 52 that covers the propagative edge 360 of the near-field generation layer 36.

On account of the surface plasmon 60 propagating in this manner, the surface plasmon 60, in other words, the electric field, concentrates on the near-field generation end surface 36a having the vertex 360a which is the arrival point of the propagative edge 360 that reaches the head end surface 2210.

As a result, the near-field 62 is generated from the near-field generation end surface 36a. The near-field 62 is irradiated toward the magnetic recording layer of the magnetic disk 10, reaches the surface of the magnetic disk 10, and heats a portion of the magnetic recording layer of the magnetic disk 10. Accordingly, the anisotropic magnetic field (coercive force) of such a portion is lowered to a level where writing is possible. Immediately thereafter, writing is performed to this portion by applying the writing magnetic field 63 that is generated from the main magnetic pole 3400. Thermally-assisted magnetic recording becomes possible by following this type of sequence in this manner.

Here, as described above, the light emitting position of the near-field 62 on the near-field generation end surface 36a can be positioned at the trailing side (the end edge 361a side) that is nearer to the first main magnetic pole unit 3400a by adjusting the shape and size of the near-field generation end surface 36a on the head end surface 2210. Accordingly, a writing magnetic field having a sufficiently large gradient can be applied to a sufficiently heated part of the magnetic recording layer of the magnetic disk 10. As a result, a stable writing operation can be reliably implemented through thermal assistance.

Further, in the above surface plasmon-generator 36, the propagative edge 360 in which the surface plasmon propagates is a propagation region that has a very narrow width in the track width direction. Further, the cross-section according to the YZ plane of the surface plasmon-generator 36 in the present embodiment has a triangular shape, and particularly has a predetermined triangular shape in the vicinity of the head end surface 2210. Therefore, the near-field generation end surface 36a, which is exposed at the polished surface, is formed in a predetermined shape (triangular in the present embodiment) with an extremely small size. Thereby, it is possible to surely propagate the surface plasmon.

In addition, in thermally-assisted magnetic recording that uses the surface plasmon mode such as described above, the optical power efficiency in the surface plasmon-generator 36 is more or less about 20%, which is in contrast to about 5 to 10% or less, as can be seen in reported examples using a conventional plasmon-generator. This is a significant improvement.

In this manner, the surface plasmon-generator 36 is not heated in an extreme manner, and protrusions toward the magnetic disk 10 of the near-field generation end surface 36a can be suppressed.

Further, in the conventional embodiment in which laser light propagated by the waveguide is directly irradiated to the plasmon-generator provided in the head end surface position, a large portion of the irradiated laser light is converted to heat energy within the plasmon-generator.

Meanwhile, the size of the plasmon-generator is set to be below the laser light wavelength, and the solid volume thereof is very small. Therefore, the plasmon-generator, on account of this heat energy, reaches extremely high temperatures up to, for example, 500° C. In contrast to this, the thermally-assisted magnetic recording head in the present embodiment utilizes the surface plasmon mode and generates the near-field 62 by propagating the surface plasmon 60 towards the head end surface 2210.

By doing this, the temperature at the time of near-field generation in the near-field generation end surface 36a is greatly reduced to about, for example, 100° C. As a result, protrusion of the near-field generation end surface 36a in a direction toward the magnetic disk 10 is suppressed, thereby enabling favorable thermally-assisted magnetic recording.

Figure 12A:
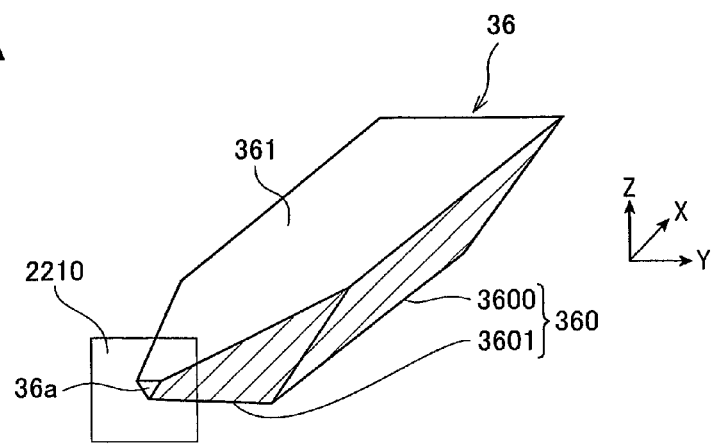
FIG. 12A through 12C are schematic views showing various embodiments in the surface plasmon-generator.
Figure 12B:
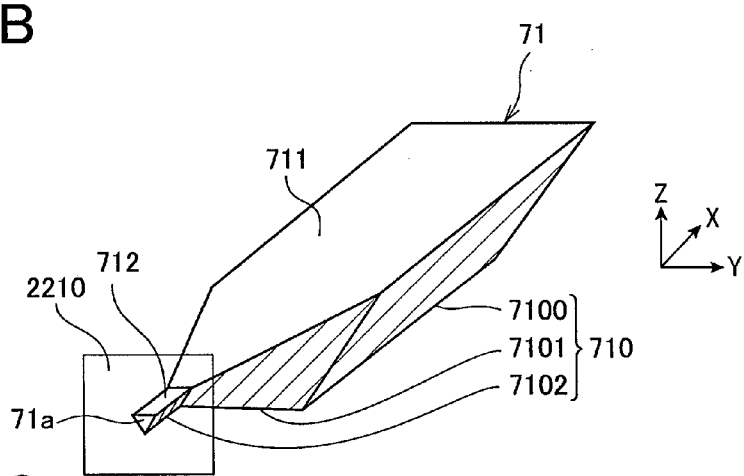
Figure 12C:
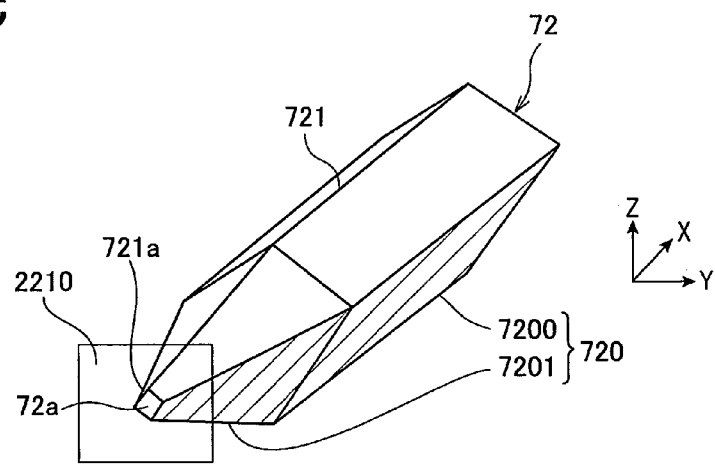

FIGS. 12A~12C are schematic views illustrating various embodiments for the surface plasmon-generator according to the present invention.

According to the embodiment illustrated in FIG. 12A, the surface plasmon-generator 36 illustrated in FIG. 9 is blade shaped. Herein, the propagative edge 360 corresponding to the blade tip includes a portion 3600 parallel to the upper surface 361 that is the end surface of the opposite side to the propagative edge 360, and includes a portion 3601 that extends so as to approach the upper surface 361 as moving toward the near-field generation end surface 36a (head end surface 2210) and that reaches the near-field generation end surface 36a. In addition, the cross-sectional shape in the YZ plane (surface parallel to the head end surface 2210) forms an isosceles triangle with the propagative edge 360 making a vertex, and the shape of the near-field generation end surface 36a also forms an isosceles triangle.

According to the embodiment illustrated in FIG. 12B, the surface plasmon-generator 71 has a shape in which the protrusion 712 is linked to the portion of the blade shape. Here, the propagative edge 710 corresponding to the blade tip includes a portion 7100 parallel to the propagative edge upper surface 711, a portion 7101 that extends so as to approach the upper surface 711 as moving toward the near-field generation end surface 71a, and a portion 7102 that is parallel to the upper surface 701 and reaches the near-field generation end surface 71a (head end surface 2210). In addition, the cross-sectional shape in the YZ plane (surface parallel to the head end surface 2210) forms an isosceles triangle with the propagative edge 710 forming a vertex, and the shape of the near-field generation end surface 71a also forms an isosceles triangle.

With this manner of surface plasmon-generator 71, the near-field light emitting position on the near-field generation end surface 71a can be adjusted, for example, more upwardly (+Z direction) by adjusting the size and vertex angle of the isosceles triangle of the near-field generation end surface 71a. As a result, a writing magnetic field having a sufficiently large gradient can be applied to a sufficiently heated part in the magnetic recording layer of the magnetic disk by arranging the surface plasmon-generator 71 sufficiently near to the main magnetic pole.

According to the embodiment illustrated in FIG. 12C, the surface plasmon-generator 72 provides a near-field generation end surface 72a that is a square (diamond shaped in the present embodiment). Herein, the propagative edge 720 includes a portion 7200 that is parallel to the upper edge 721, and a portion 7201 that extends so as to approach the upper edge 721 as moving toward the near-field generation end surface 72a and that reaches the near-field generation end surface 72a. In addition, the cross-sectional shape in the YZ plane (surface parallel to the head end surface 2210) forms a square (diamond shaped in the present embodiment) in which the propagative edge 720 portion forms a single vertex.

With this manner of surface plasmon-generator 72, the light emitting position of the near-field on the near-field generation end surface 72a can be adjusted, for example, to the end 721a of the edge 721 by adjusting the size and vertex angle of the diamond shape of the near-field generation end surface 72a. As a result, a writing magnetic field having a sufficiently large gradient can be applied to a sufficiently heated part of the magnetic recording layer of the magnetic disk by arranging the surface plasmon-generator 72 sufficiently near to the main magnetic pole.

FIGS. 13A~13D are schematic views illustrating various embodiments that relate to the shape and arrangement of the waveguide according to the present invention, surface plasmon-generator and the main magnetic pole.

Figure 13A:
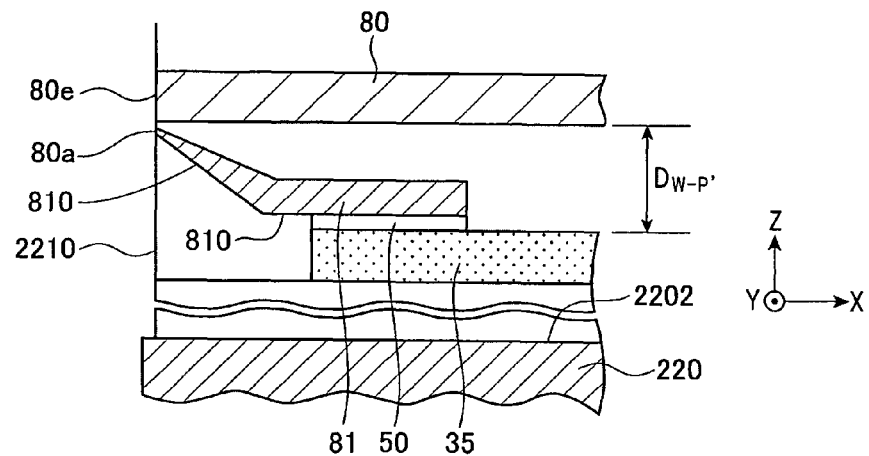
FIG. 13A through 13D are schematic views showing various embodiments concerning the shape and arrangement of the light waveguide, surface plasmon-generator, and the main magnetic pole.

According to FIG. 13A, the main magnetic pole 80 is a single layer that extends in parallel to the element formation surface 2202. Further, the portion of the head end surface 2210 side of the surface plasmon-generator 81 inclines with respect to the element formation surface 2202 so as to approach the end part of the head end surface 2210 side of the main magnetic pole 80 as moving toward the head end surface 2210. Even in this type of embodiment, on the head end surface 2210, the distance $D_{W-P}'$ in the Z direction between the waveguide 35 and main magnetic pole 80 can be set to a sufficiently large value while positioning the near-field generation end surface 81a of the surface plasmon-generator 81 in the vicinity of the end surface 80e of the main magnetic pole 80. Accordingly, it is more surely possible to avoid a situation where a portion of laser light is absorbed by the main magnetic pole, causing a reduction of a light quantity that is to be converted to the near-field.

Figure 13B:
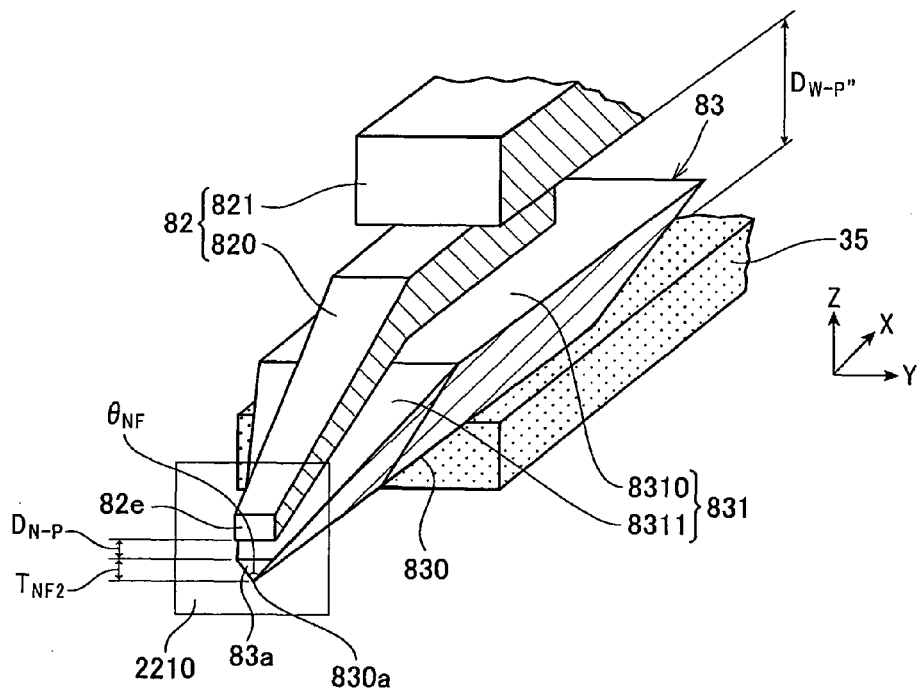

According to FIG. 13B, the surface plasmon-generator 83 provides a propagative edge 830 that extends in a straight line to reach the near-field generation end surface 83a. Further, the end surface 831 that is the opposite side to the propagative edge 830 of the surface plasmon-generator 83 includes a portion 8310 that is parallel to the propagative edge 830 and a portion 8311 that inclines so as to approach the propagative edge 830 as moving toward the near-field generation end surface 83a. In addition, the cross-sectional shape in the YZ plane (surface parallel to the head end surface 2210) of the surface plasmon-generator 83 forms an isosceles triangle with the propagative edge 830 making a vertex, and the shape of the near-field generation end surface 83a also forms an isosceles triangle.

Further, the main magnetic pole layer 82 includes a main magnetic pole 820 and a main magnetic pole body part 821. Of these, the portion of the head end surface 2210 side of the main magnetic pole 820 inclines so as to approach the portion of the head end surface 2210 side of the surface plasmon-generator 83, or, in other words, the end surface portion 8311, as moving toward the head end surface 2210. Even in this type of embodiment, on the head end surface 2210, the distance $D_{W-P}''$ in the Z direction between the waveguide 35 and the main magnetic pole 82 can be set to a sufficiently large value while positioning the near-field generation end surface 83a of the surface plasmon-generator 83 in the vicinity of the end surface 82e of the main magnetic pole 82. Accordingly, it is more surely possible to avoid a situation where a portion of laser light is absorbed by the main magnetic pole, causing a reduction of a light quantity that is to be converted to the near-field.

Figure 13C:
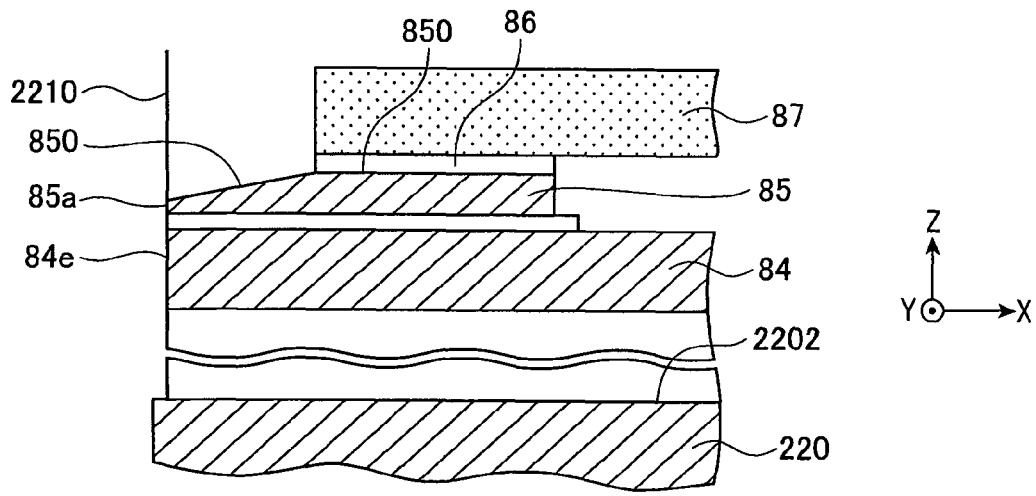

According to FIG. 13C, in the present embodiment, the main magnetic pole 84, the surface plasmon-generator 85, the buffer portion 86, and the waveguide 87 are layered in order from the slider substrate 220 side toward the +Z direction. Further, the propagative edge 850 that propagates the surface plasmon is positioned at the opposite side to the main magnetic pole 84 of the surface plasmon-generator 85, and extends to the near-field generation end surface 85a. As a result, the near-field generation end surface 85*a* is arranged at the trailing side (+Z side) of the end surface 84*e* of the main magnetic pole 84 on the head end surface 2210. Even in this type of embodiment, a writing magnetic field having a sufficiently large gradient can be applied to a sufficiently heated part of the magnetic recording layer of the magnetic disk by arranging the surface near-field generation end surface 85*a* sufficiently near to the end surface 84*e* of the main magnetic pole 84.

Figure 13D:
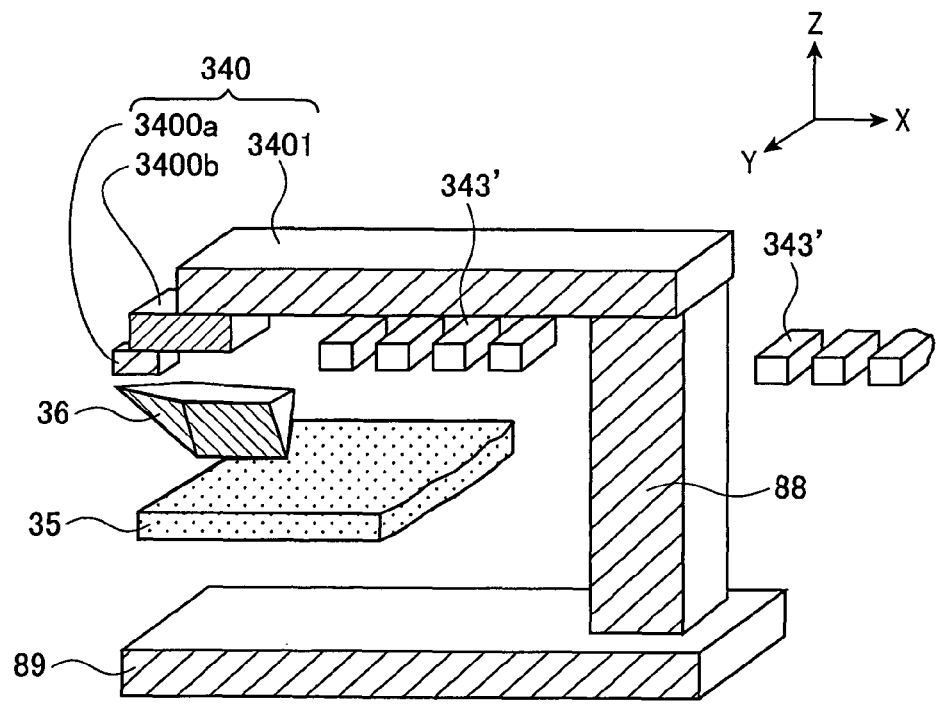

In the embodiment illustrated in FIG. 13D, the arrangement of the waveguide 35, the surface plasmon-generator 36, and the main magnetic pole layer 340 is the same as the embodiment illustrated in FIG. 8 and FIG. 9; however the write shield layer 89, is the return yoke to receive the magnetic flux that returns from the magnetic disk, is provided at the opposite side to the waveguide 35 and the main magnetic pole layer 340 of the surface plasmon-generator 36, namely, the leading side (−Z side). Further, the write shield layer 89 and the main magnetic pole layer 340 are electrically connected by the back contact part 88. In addition, the write coil layer 343' is formed such that a part of the write coil layer 343 is disposed between at least the main magnetic pole layer 340 and the write shield layer 89 during a single revolution, and has a spiral structure that is rotated around the back contact part 88 as the center. Even in this type of embodiment, favorable thermally-assisted magnetic recording can be performed using the surface plasmon of the present invention.

Figure 14:
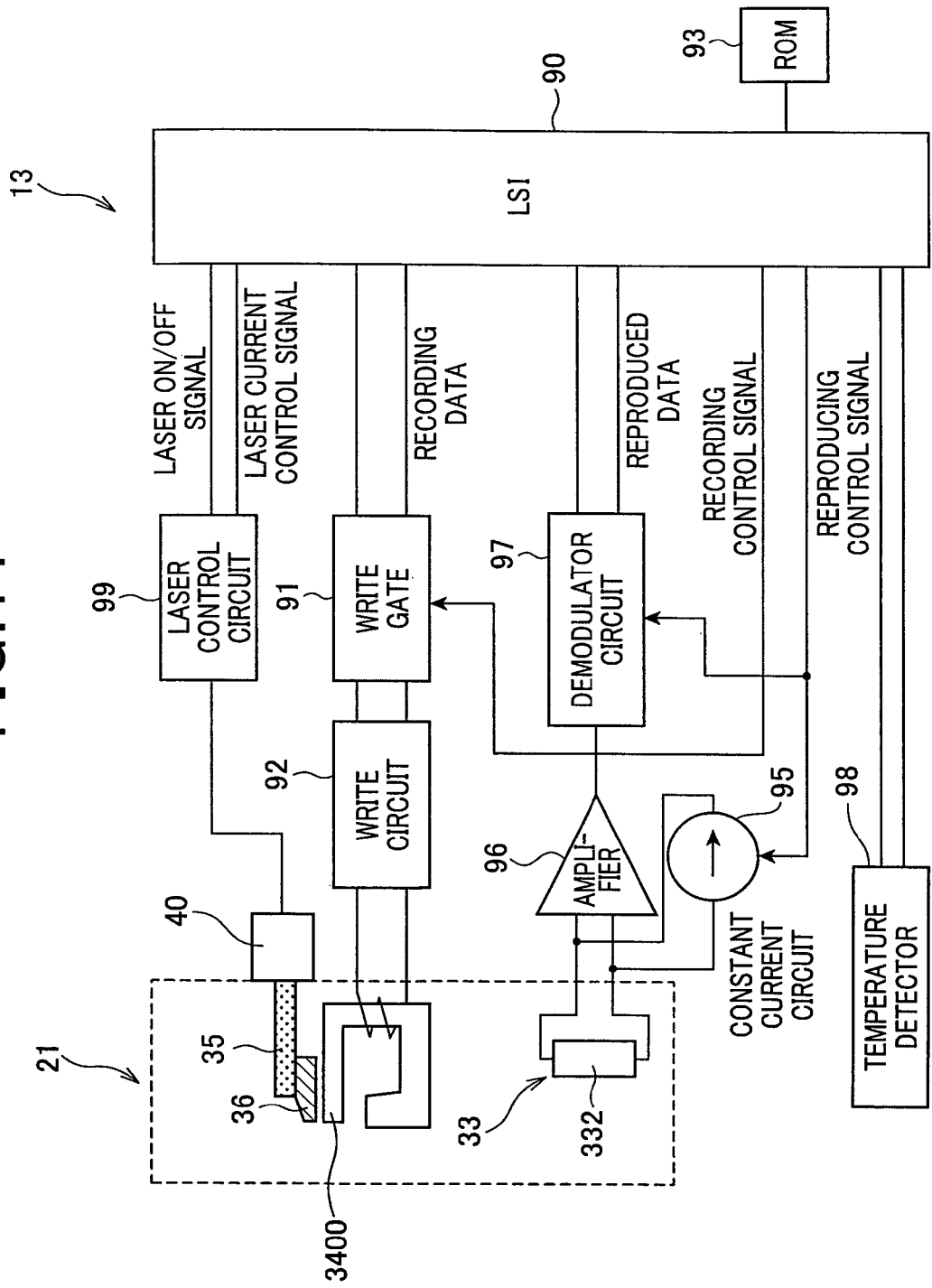
FIG. 14 is a block diagram showing a circuit of the recording reproduction of the magnetic disk device and light emission control device shown in FIG. 6.

FIG. 14 is a block view illustrating the circuit configuration of the record reproduction and light emitting control circuit 13 of the magnetic disk device illustrated in FIG. 6.

Respectively illustrated in FIG. 14, 90 is a control large-scale integration (LSI); 91 is a write gate to receive the recorded data from the control LSI 90; 92 is a write circuit; 93 is a read-only memory (ROM) for storing control tables of operating current values that are supplied to the laser diode 40; 95 is a constant current circuit for supplying sense current to the MR element 33; 96 is an amplifier for amplifying the output voltage of the MR element 33; 97 is a demodulator circuit for amplifying reproduced data in relation to the control LSI 90; 98 is a temperature detector; and 99 is a control circuit for the laser diode 40.

The recorded data output from the control LSI 90 is supplied to the write gate 91. The write gate 91 supplies the recorded data to the write circuit 92 only when the recording control signal that is output from the control LSI 90 instructs a writing operation. The write circuit 92 sends write current to the write coil layer 343 according to the recorded data, and writing is performed onto the magnetic disk by the writing magnetic field generated from the main magnetic pole 3400.

Constant current flows from the constant current circuit 95 to the MR multilayer 332 only when the reproducing control signal that is output from the control LSI 90 instructs a reading operation. The signal reproduced by the MR element 33 is demodulated by the demodulator circuit 97 after being amplified by the amplifier 99, and the obtained reproduction data is output to the control LSI 90.

The laser control circuit 99 receives the laser ON/OFF signal and the operating current control signal that are output from the control LSI 90. When the laser ON/OFF signal is an ON operation instruction, an operating current which meets or exceeds the oscillating threshold value is applied to the laser diode 40. Accordingly, the laser diode 40 illuminates, and laser light propagates through the waveguide 35 to couple with the surface plasmon-generator 36 in the surface plasmon mode. Accordingly, the near-field is generated from the end of the surface plasmon-generator 36, is irradiated to the magnetic recording layer of the magnetic disk, and heats the magnetic recording layer. The operating current value at this time is controlled to a value that corresponds to the operating current control signal. The control LSI 90 generates a laser ON/OFF signal according to the timing with the recording and reproducing operations, considers the temperature and the like of the magnetic recording layer of the magnetic disk measured by the temperature detector 98, and determines a value for the operating current value control signal based on a control table within the ROM 93. Herein, the control table may include not only oscillating threshold values and temperature dependencies for light output—operation current properties, but also data with respect to the relationship between the operating current values and the temperature rise portion of the magnetic recording layer where the thermally-assisted operation is received, as well as data with respect to temperature dependencies for anisotropic magnetic field (coercive force) of the magnetic recording layer. As discussed, by providing laser ON/OFF signals and operating current value control signal system separately from the recording/reproducing operating control signal system, the laser diode 40 that is simply linked to the recording operation can be energized by distributing power thereto. Also, a more diverse power distribution mode can be realized.

Moreover, the circuit configuration of the recording/reproducing and light emitting control circuit 13 is obviously not limited to that illustrated in FIG. 14. Writing operations and reading operations may be specified by signals other than the recording control signal and the reproducing control signal.

A more detailed description will be given of the present invention by giving a specific embodiment regarding the optical waveguide of the present invention described above.

First Experimental Example

The configuration of the optical waveguide of a present invention sample as shown in FIG. 1 and FIG. 2 was prepared or, in other words, a concave part 1250 was formed at the incident light side of the core 1200, with the concave part providing a curved surface with radius R as shown in FIG. 1.

A simulation experiment was performed to examine how the radius R value impacted the optical coupling efficiency in the incident end part of the optical waveguide and the incident light by changing the value of the radius R in various manners in the concave part.

Each specific specification for performing the simulation tests was as follows:

(Simulation Conditions)

Core material: TaOx (Refractive index: 2.15)

Size of the incident cross section of the core: W1=4.0 μm, h1=2.0 μm in FIG. 2

Shape of concave part 1250 (Configuration of FIG. 1 and FIG. 2, Radius R: parameter)

Clad material: $Al_2O_3$ (Refractive index: 1.65)

Laser light used: Wavelength 800 nm, TM polarization

Condensed beam using a lens system for condensation of light

Spot size: 1 μM

Condensation place: position where 1 μm inside of the TaOx core

Distance from the lens system to the waveguide incident edge part: 3 μm

Figure 15:
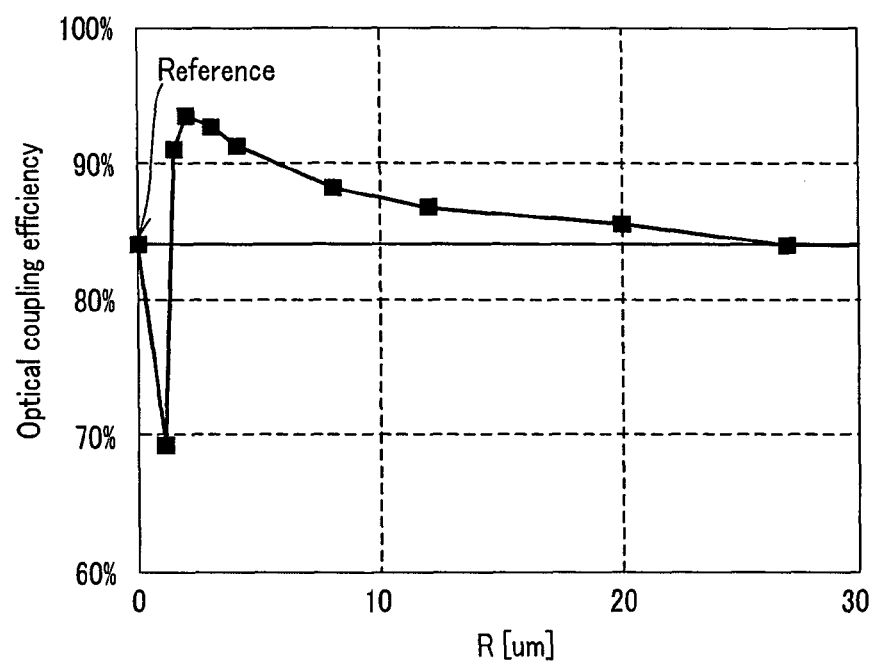
FIG. 15 is a graph showing the relationship between the R value and the optical coupling efficiency when modifying the R value of the concave part that provides a curved surface of radius R.

The results analyzed by the simulations are shown in Table 1 below, and the results are described in a graph in FIG. 15 for easy visual confirmation of the results in Table 1. In addition, a result when R=0 is the comparable example.

TABLE 1

| R (μm) | Optical Coupling Efficiency (%) |
|---|---|
| 0 | 84 |
| 1 | 69 |
| 1.5 | 91 |
| 2 | 93 |
| 3 | 93 |
| 4 | 91 |
| 8 | 88 |
| 12 | 97 |
| 20 | 86 |
| 27 | 84 |

The optical coupling efficiency is 84% when R=0 and, by having this value as the basis, it is favorable if the optical coupling efficiency is higher than the value.

The efficacy of the present invention is evident according to the above results.

In other words, the optical waveguide of the invention of the present application is an optical waveguide for directly introducing light beams emitted from the light emitting element, and the core, which is the waveguide through which light propagates, provides a concave part that is a depression on the light incident end surface that is one side where light enters, thereby making it possible to realize an optical waveguide that can obtain a large optical coupling efficiency by the operation of phase alignment in the concave part.

What is claimed is:

1. An optical waveguide for introducing a light beam that is emitted from a light emitting element, wherein
the optical waveguide is structured having a core that is a waveguide through which light propagates and a clad that surrounds the periphery thereof, and a refractive index of a material that forms the core is larger than a refractive index of a material that forms the clad; and
the core provides a light incident end surface that is one side where light enters and a light emitting end surface that emits the light that propagates within the waveguide, and a phase alignment concave part that is a depression formed on the light incident end surface that is one side where light enters, wherein
the phase alignment concave part is structured to align phases of light beams to increase optical coupling efficiency, and
the light beams are emitted from the light emitting element and enter into the optical waveguide.

2. The optical waveguide according to claim 1, wherein
a cross section that is perpendicular to a light traveling direction in the core forms a quadrilateral shape, and the phase alignment concave part is structured to provide a curved surface with a radius R, and the value of the radius R is configured so as to be within a range R=1.4~20 μm.

3. The optical waveguide according to claim 1, wherein
a cross section that is perpendicular to a light traveling direction in the core forms a quadrilateral shape, and the phase alignment concave part is structured to provide a curved surface with radius R, and the value of the radius R is configured so as to be within a range R=1.5~4 μm.

4. The optical waveguide according to claim 1, wherein
a cross section that is perpendicular to a light traveling direction in the core forms a quadrilateral shape, and the phase alignment concave part is structured so as to be substantially a quadrangular pyramid trapezoid shape that tapers toward the light traveling direction.

5. The optical waveguide according to claim 1, wherein
a cross section that is perpendicular to a light traveling direction in the core forms a quadrilateral shape, and a size of an outer frame of the light incident end surface of the phase alignment concave part is the same as a size of an outer frame of a core cross section, and these outer frame sizes are structured so as to be 5 μm×5 μm or less.

6. The optical waveguide according to claim 1, wherein
a cross section that is perpendicular to the light traveling direction in the core forms a quadrilateral shape, and a size of an outer frame of the light incident end surface of the phase alignment concave part is smaller than an outer frame of a core cross section.

7. The optical waveguide according to claim 1, wherein
a material of the core is configured so as to be one type selected from a group that includes TaOx, ZrOx, TiOx and SiOn with a refractive index of 1.8 or above, and AlON with a refractive index of 1.8 or above; and
a material of the clad is configured so as to be one type selected from a group that includes $Al_2O_3$, MgO, $SiO_2$ and SiON with a refractive index of less than 1.8, and AlON with a refractive index of less than 1.8.

8. The optical waveguide according to claim 1, wherein
an antireflection film is formed on a front surface of the phase alignment concave part.

9. A thermally-assisted magnetic recording head, comprising:
a magnetic pole for generating a writing magnetic field from an end surface of an air bearing surface (ABS) side,
the optical waveguide of claim 1 through which light propagates to excite a surface plasmon, and
a plasmon generator that is a part with which the light couples in the surface plasmon mode.

10. An optical waveguide, comprising:
a core through which light propagates, the core including:
a light incident end surface into which light enters,
a light emitting end surface from which the light exits, and
a phase alignment concave part formed on the light incident end surface; and
a clad that surrounds the periphery of the core, a refractive index of a material that forms the core is larger than a refractive index of a material that forms the clad, wherein
the phase alignment concave part is structured to align phases of light beams to increase optical coupling efficiency, and
the light beams are emitted from a light emitting element and enter into the optical waveguide.

11. A thermally-assisted magnetic recording head, comprising:
a light emitting element that emits light to the light incident end surface of the core;
the optical waveguide of claim 1; and
a plasmon generator that is provided in a vicinity of the light emitting end surface of the core and that is configured to excite a surface plasmon by the light that exits from the light emitting end surface.

12. An optical waveguide system, comprising:
the optical waveguide according to claim 1; and
the light emitting element that emits the light beam, wherein the optical waveguide is configured to introduce the light beam that is emitted from the light emitting element.

13. The optical waveguide system according to claim 12, further comprising:

a lens system positioned between the light emitting element and the optical waveguide, wherein the light beam emitted from the light emitting element is emitted to the phase alignment concave part through the lens system.

* * * * *